US008330039B2

(12) United States Patent
Smith et al.

(10) Patent No.: US 8,330,039 B2
(45) Date of Patent: *Dec. 11, 2012

(54) SOLAR CELL MODULES WITH POLY(VINYL BUTYRAL) ENCAPSULANT COMPRISING UNSATURATED HETEROCYCLIC COMPOUND

(75) Inventors: Rebecca L. Smith, Vienna, WV (US); Jason S. Wall, Middletown, DE (US); Katherine M. Stika, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/692,069

(22) Filed: Jan. 22, 2010

(65) Prior Publication Data

US 2010/0180947 A1 Jul. 22, 2010

Related U.S. Application Data

(60) Provisional application No. 61/226,435, filed on Jul. 17, 2009, provisional application No. 61/221,771, filed on Jun. 30, 2009, provisional application No. 61/146,535, filed on Jan. 22, 2009.

(51) Int. Cl.
*H01L 31/0216* (2006.01)
*H01L 21/02* (2006.01)

(52) U.S. Cl. ........ 136/254; 136/243; 136/244; 136/245; 136/246; 136/247; 136/248; 136/249; 136/250; 136/251; 136/252; 136/253; 136/255; 136/256; 136/257; 136/258; 136/259; 136/260; 136/261; 136/262; 136/263; 136/264; 136/265; 438/64

(58) Field of Classification Search .......... 136/243–265; 438/64

See application file for complete search history.

(56) References Cited

U.S. PATENT DOCUMENTS

| | | | |
|---|---|---|---|
| 5,300,414 A | 4/1994 | Leppard et al. | |
| 5,582,653 A | 12/1996 | Kataoka et al. | |
| 5,680,245 A | 10/1997 | Lynam | |
| 2008/0128018 A1* | 6/2008 | Hayes | 136/249 |
| 2010/0180940 A1* | 7/2010 | Cui | 136/256 |
| 2010/0180942 A1 | 7/2010 | Smith et al. | |
| 2010/0180943 A1 | 7/2010 | Smith et al. | |
| 2010/0180947 A1 | 7/2010 | Smith et al. | |
| 2011/0114159 A1 | 5/2011 | Smith et al. | |
| 2012/0160304 A1 | 6/2012 | Smith et al. | |
| 2012/0167958 A1 | 7/2012 | Smith et al. | |

FOREIGN PATENT DOCUMENTS

EP 1311001 A1 5/2003

OTHER PUBLICATIONS

PCT International Search Report and Written Opinion for International Application No. PCT/US2010/021829 dated Mar. 5, 2010.
Guangzhou Lihold Chemical Co., Ltd., Benzotriazole, 2008. Retrieved From Internet: <URL: http//lihold.com/benzotriazole.htm. pp. 1-2.
Merck Index Twelfth Edition, Merck & Co., Inc., 1996, p. 186, #1138.
Steppan et al, A Review of Corrosion Failure Mechanisms during Accelerated Tests, J. Electrochem. Soc.: Solid-State Science and Technology, Jan. 1987, pp. 175-190.

* cited by examiner

*Primary Examiner* — Brian P Mruk
(74) *Attorney, Agent, or Firm* — Maria M. Kourtakis; Kelly Law Registry; Tong T. Li

(57) ABSTRACT

Provided is a solar cell module that comprises a solar cell assembly. The solar cell assembly is encapsulated by a poly (vinyl butyral) encapsulant and contains a silver component that is at least partially in contact with the poly(vinyl butyral) encapsulant. The poly(vinyl butyral) encapsulant comprises poly(vinyl butyral), about 15 to about 45 wt % of one or more plasticizers, and about 0.1 to about 2 wt % of one or more unsaturated heterocyclic compounds, based on the total weight of the poly(vinyl butyral) encapsulant. Further provided are an assembly for preparing the solar cell module; a process for preventing or reducing the discoloration of a poly(vinyl butyral) encapsulant in contact with a silver component in the solar cell module; and the use of the solar cell module to convert solar energy to electricity.

16 Claims, No Drawings

SOLAR CELL MODULES WITH POLY(VINYL BUTYRAL) ENCAPSULANT COMPRISING UNSATURATED HETEROCYCLIC COMPOUND

CROSS-REFERENCE TO RELATED APPLICATIONS

This application claims priority under 35 U.S.C. §120 to U.S. Provisional Appln. Nos. 61/146,535, filed on Jan. 22, 2009, 61/221,771, filed on Jun. 30, 2009, and 61/226,435, filed on Jul. 17, 2009, each of which is incorporated herein by reference in its entirety.

FIELD OF THE INVENTION

The invention is directed to a solar cell module comprising an improved poly(vinyl butyral) composition useful as an encapsulant material for solar cell assemblies. In particular, the improved poly(vinyl butyral) composition is resistant to yellowing upon prolonged contact with components of the assemblies that comprise elemental silver and alloys of elemental silver.

BACKGROUND OF THE INVENTION

Several patents and publications are cited in this description in order to more fully describe the state of the art to which this invention pertains. The entire disclosure of each of these patents and publications is incorporated by reference herein.

Because solar cells provide a sustainable energy resource, their use is rapidly expanding. Solar cells can typically be categorized into two types based on the light absorbing material used, i.e., bulk or wafer-based solar cells and thin film solar cells.

Monocrystalline silicon (c-Si), poly- or multi-crystalline silicon (poly-Si or mc-Si) and ribbon silicon are the materials used most commonly in forming the more traditional wafer-based solar cells. Solar cell modules derived from wafer-based solar cells often comprise a series of about 180 and about 240 µm thick self-supporting wafers (or cells) that are soldered together. Such a panel of solar cells, along with a layer of conductive paste and/or connecting wires deposited on its surface, may be referred to as a solar cell assembly and encapsulated by or sandwiched or laminated between polymeric encapsulants, which may be further sandwiched between two protective outer layers to form a weather resistant module. The protective outer layers may be formed of glass, metal sheets or films, or plastic sheets or films. In general, however, the outer layer that faces to the sunlight should be sufficiently transparent to allow photons reach the solar cells.

In the increasingly important alternative, thin film solar cells, the commonly used materials include amorphous silicon (a-Si), microcrystalline silicon (µc-Si), cadmium telluride (CdTe), copper indium selenide ($CuInSe_2$ or CIS), copper indium/gallium diselenide ($CuIn_xGa_{(1-x)}Se_2$ or CIGS), light absorbing dyes, organic semiconductors, etc. By way of example, thin film solar cells are described in U.S. Pat. Nos. 5,507,881; 5,512,107; 5,948,176; 5,994,163; 6,040,521; 6,123,824; 6,137,048; 6,288,325; 6,258,620; 6,613,603; and 6,784,301; and U.S. Patent Publication Nos. 20070298590; 20070281090; 20070240759; 20070232057; 20070228285; 20070227578; 20070209699; 20070079866; 20080223436; and 20080271675. Thin film solar cells with a typical thickness of less than 2 µm are produced by depositing the semiconductor materials onto a substrate in multi-layers. Further, connecting wires, metal conductive coatings, and/or metal reflector films may be deposited over the surface of the thin film solar cells to constitute part of the thin film solar cell assembly. The substrate may be formed of glass or a flexible film and may also be referred to as superstrate in those modules in which it faces to the sunlight. Similarly to the wafer-based solar cell modules, the thin film solar cell assemblies are further encapsulated by or laminated or sandwiched between polymeric encapsulants, which are further laminated or sandwiched between protective outer layers. In certain solar cell modules, the thin film solar cell assembly may be only partially encapsulated by the encapsulant, so that only the side of the thin film solar cell assembly that is opposite from the substrate (or superstrate) is laminated to a polymeric encapsulant and then a protective outer layer. In such a construction, the thin film solar cell assembly is sandwiched between the substrate (or superstrate) and the encapsulant on the opposite side.

Within the solar cell modules, some components (such as connecting wires, conductive paste (used in wafer-based solar cell modules), conductive coatings (used in thin film solar cells) and back reflector films) may comprise oxidizable silver or a silver alloy. When in contact with an oxidizable silver component, an encapsulant comprising poly(vinyl butyral) (PVB) tends to discolor over time. Discoloration is not desirable in the photovoltaic industry, because it decreases the transmission of light, and because it may be considered aesthetically unpleasing. Thus, there is a need to develop a PVB composition that is useful as an encapsulant material for solar cell modules and that has improved resistance to discoloration when in prolonged contact with oxidizable silver components.

SUMMARY OF THE INVENTION

A solar cell module comprising a solar cell assembly encapsulated by poly(vinyl butyral) and containing a silver component, wherein the silver component is at least partially in contact with the poly(vinyl butyral) and the poly(vinyl butyral) comprises about 15 to about 45 wt % of plasticizer and about 0.5 to about 2 wt %, preferably about 0.1 to about 2 wt %, of unsaturated heterocyclic compound, based on the total weight of the poly(vinyl butyral).

An assembly for preparing a solar cell module comprising a solar cell assembly, which comprises a silver component, and a poly(vinyl butyral) sheet having a thickness of about 0.25 mm to about 1.2 mm and comprising about 15 to about 45 wt % of plasticizer and about 0.5 to about 2 wt %, preferably about 0.1 to about 2 wt %, of unsaturated heterocyclic compound, based on the total weight of the poly(vinyl butyral) sheet.

A process of preventing discoloration of poly(vinyl butyral) encapsulant in a solar cell module comprising a solar cell assembly that comprises a silver component in complete or partial contact with the poly(vinyl butyral) encapsulant, comprising providing a poly(vinyl butyral) comprising about 15 to about 45 wt % of plasticizer and about 0.5 to about 2 wt %, preferably about 0.1 to about 2 wt %, of unsaturated heterocyclic compound, based on the total weight of the poly (vinyl butyral), and encapsulating a solar cell assembly with the poly(vinyl butyral).

A process of preventing discoloration of poly(vinyl butyral) encapsulant in a solar cell module comprising a solar cell assembly that comprises a silver component in complete or partial contact with the poly(vinyl butyral) encapsulant, comprising providing a poly(vinyl butyral) sheet having a thickness of about 0.25 mm to about 1.2 comprising about 15 to about 45 wt % of plasticizer and about 0.5 to about 2 wt %, preferably about 0.1 to about 2 wt %, of unsaturated heterocyclic compound, based on the total weight of the poly(vinyl butyral), and forming a solar cell module including the step of laminating the solar cell assembly to the poly(vinyl butyral) sheet.

DETAILED DESCRIPTION OF THE INVENTION

Unless otherwise defined, all technical and scientific terms used herein have the same meaning as commonly understood by one of ordinary skill in the art to which this invention belongs. In case of conflict, the specification, including definitions, will control.

Although methods and materials similar or equivalent to those described herein can be used in the practice or testing of the invention, suitable methods and materials are described herein.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The term "or", as used herein, is inclusive; that is, the phrase "A or B" means "A, B, or both A and B". Exclusive "or" is designated herein by terms such as "either A or B" and "one of A or B", for example.

The transitional phrase "consisting essentially of" limits the scope of a claim to the specified materials or steps and those that do not materially affect the basic and novel characteristic(s) of the claimed invention.

Where applicants have defined an invention or a portion thereof with an open-ended term such as "comprising," it should be readily understood that unless otherwise stated the description should be interpreted to also describe such an invention using the terms "consisting essentially of" and "consisting of".

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

As used herein, the term "copolymer" refers to polymers comprising copolymerized units resulting from copolymerization of two or more comonomers. Such copolymers include dipolymers, terpolymers or higher order copolymers. In this connection, a copolymer may be described herein with reference to its constituent comonomers or to the amounts of its constituent comonomers, for example "a copolymer comprising ethylene and 18 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

An improved poly(vinyl butyral) (PVB) composition useful as an encapsulant material in solar cell modules comprises (a) a PVB polymer at a level of about 85 wt %, or about 80 wt %, or about 75 to about 55 wt %, or about 65 wt %, or about 70 wt %; (b) one or more plasticizers at a level of about 15 wt %, or about 20 wt %, or about 25 wt % to about 45 wt %, or about 35 wt %, or about 30 wt %, based on the total weight of the PVB composition, and (c) one or more unsaturated heterocyclic compounds at a level of about 0.1 wt %, or about 0.15 wt %, or about 0.1 wt % to about 2 wt %, or about 0.2 wt % to about 1 wt %, or about 0.5 wt % to about 2 wt %, or about 0.8 wt %, or about 0.75 wt %, or about 0.5 wt %, or about 0.4 wt %, or about 0.3 wt % based on the total weight of the PVB composition. The amount of PVB resin may be adjusted by subtracting the weight percentage of the heterocyclic compound(s) and of any other additives described herein, so that the sum of the weight percentages of the components of the improved PVB composition is 100 wt %. The improved PVB composition exhibits reduced yellowing after prolonged contact with silver-containing components of the solar cell module.

PVB is a vinyl resin resulting from the condensation of poly(vinyl alcohol) with butyraldehyde. The PVB may be produced by aqueous or solvent acetalization. In a solvent process, acetalization is carried out in the presence of sufficient solvent to dissolve the PVB and produce a homogeneous solution at the end of acetalization. The PVB is separated from solution by precipitation of solid particles with water, which are then washed and dried. Solvents used are lower aliphatic alcohols such as ethanol. In an aqueous process, acetalization is carried out by adding butyraldehyde to a water solution of poly(vinyl alcohol) at a temperature of about 20° C. to about 100° C., in the presence of an acid catalyst, agitating the mixture to cause an intermediate PVB to precipitate in finely divided form and continuing the agitation while heating until the reaction mixture has proceeded to the desired end point, followed by neutralization of the catalyst, separation, stabilization and drying of the PVB. For example, PVB can be produced as described in U.S. Pat. Nos. 3,153,009 and 4,696,971.

Suitable PVB resins have a weight average molecular weight of about 30,000 Da, or about 45,000 Da, or about 200,000 Da to about 600,000 Da, or about 300,000 Da, as determined by size exclusion chromatography using low angle laser light scattering. The PVB may comprise about 12 wt %, or about 14 wt %, or about 15 wt %, to about 23 wt %, or about 21 wt %, or about 19.5 wt %, or about 19 wt % of hydroxyl groups calculated as polyvinyl alcohol (PVOH). The hydroxyl number can be determined according to standard methods, such as ASTM D1396-92 (1998). In addition, the PVB used here may include up to about 10%, or up to about 3% of residual ester groups, calculated as polyvinyl ester, typically acetate groups, with the balance being butyraldehyde acetal. The PVB may further comprise a minor amount of acetal groups other than butyral, for example, 2-ethyl hexanal, as described in U.S. Pat. No. 5,137,954.

Plasticizers suitable for the PVB compositions may be any of those that known within the art (see, e.g., U.S. Pat. Nos. 3,841,890; 4,144,217; 4,276,351; 4,335,036; 4,902,464; 5,013,779; and 5,886,075). Among those commonly used plasticizers are esters of a polybasic acid or a polyhydric alcohol. Specific examples of suitable plasticizers include, but are not limited to, diesters obtained from the reaction of triethylene glycol or tetraethylene glycol with aliphatic carboxylic acids having from 6 to 10 carbon atoms; diesters obtained from the reaction of sebacic acid with aliphatic alcohols having from 1 to 18 carbon atoms; oligoethylene glycol di-2-ethylhexanoate; tetraethylene glycol di-n-heptanoate; dihexyl adipate; dioctyl adipate; dibutoxy ethyl adipate; mixtures of heptyl and nonyl adipates; dibutyl sebacate; tributoxyethyl-phosphate; isodecylphenylphosphate; triisopropylphosphite; polymeric plasticizers, such as, the oil-modified sebacid alkyds; mixtures of phosphates and adipates; mixtures of adipates and alkyl benzyl phthalates; and combinations of two or more of the above. Preferred plasticizers include triethylene glycol di-2-ethylhexanoate, tetraethylene glycol di-n-heptanoate, dibutyl sebacate, and combinations of two or more thereof. More preferred plasticizers include triethylene glycol di-2-ethylhexanoate, tetraethylene glycol di-n-heptanoate, and combination of two or more thereof. A plasticizer of note is triethylene glycol di-2-ethylhexanoate.

The PVB composition further comprises one or more unsaturated heterocylic compounds. As used herein, the term "unsaturated heterocylic compounds" includes 1H-benzotriazole and non-2H substituted benzotriazole derivatives having a formula of:

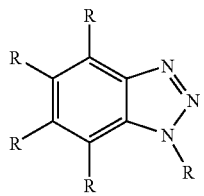

1,2,3-triazole and 1,2,3-triazole derivatives having a formula of:

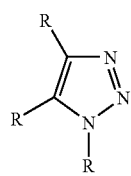

1,2,4-triazole and 1,2,4-triazole derivatives having a formula of:

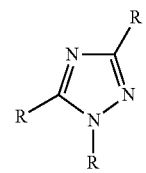

imidazole and imidazole derivatives having a formula of:

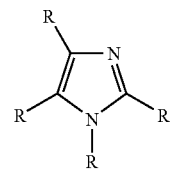

pyrrole and pyrrole derivatives having a formula of:

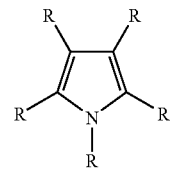

pyrazine and pyrazine derivatives having a formula of:

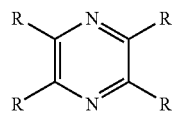

pyrimidine and pyrimidine derivatives having a formula of:

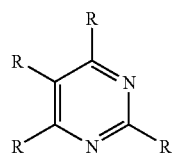

pyridine and pyridine derivatives having a formula of:

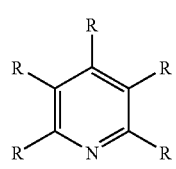

pyridizine and pyridizine derivatives having a formula of:

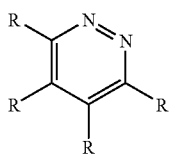

thiazole and thiazole derivatives having a formula of:

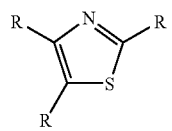

benzoxazole and benzoxazole derivatives having a formula of:

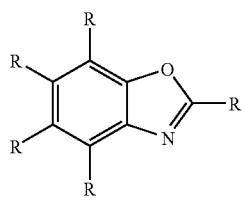

benzothiazole and benzothiazole derivatives having a formula of:

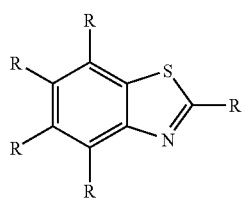

1,3,5-triazine and 1,3,5-triazine derivatives having a formula of:

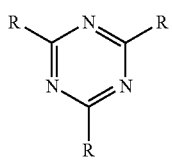

2,2'-bipyridine and 2,2'-bipyridine derivatives having a formula of:

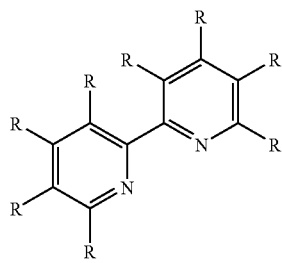

wherein R represents a hydrogen atom or a substituent (also referred to herein as an "R group" or "substituent R"); and wherein, when the unsaturated heterocyclic compound comprises more than one substituent, the substituents may be identical or different. Each substituent is independently selected from the group consisting of alkyl groups that are branched or unbranched, linear or cyclic; other non-aromatic hydrocarbon groups, such as alkenyl groups and alkynyl groups, that are also unbranched or branched, linear or cyclic, that are singly or multiply unsaturated and that contain C=C (double) or C≡C (triple) bonds; substituted or unsubstituted aromatic hydrocarbon groups, including aryl groups (e.g., phenyl and naphthyl groups); amino groups; hydroxyl groups; alkoxy groups; and halogens (e.g., F, Cl, Br, or I, preferably Cl or Br). In addition, one or more of the hydrogen atoms on one or more of the R groups may optionally be substituted with a halogen atom or a branched or unbranched alkyl group comprising 1 to 4 carbon atoms. When more than one of the hydrogen atoms of the R group(s) are substituted, these substituents may also be the same or different.

Preferred substituents R include branched alkyl groups, unbranched alkyl groups, cyclic alkyl groups, unsaturated hydrocarbon groups, substituted aryl groups, unsubstituted aryl groups, and halogen atoms. Branched or linear alkyl groups comprising 1 to 4 carbon atoms, and in particular methyl groups, are more preferred substituents R. Other examples of suitable substituents R are found below in the lists of specific examples of unsaturated heterocyclic compounds.

More specifically with respect to benzotriazole, it is well known that this compound exists as two tautomers, 1H-benzotriazole (numbered structure (i), below) and 2H-benzotriazole (numbered structure (ii), below). Because of symmetry, 3H-benzotriazole is equivalent to 1H-triazole; however, asymmetrical substitution with one or more non-hydrogen R groups will destroy this equivalence.

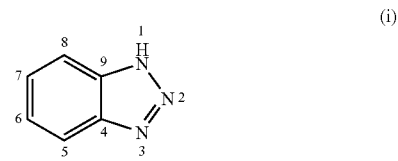

(i)

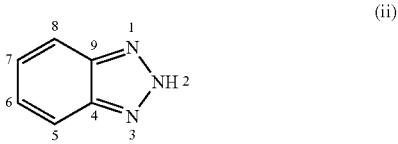

(ii)

Moreover, as used herein, the term "non-2H-substituted" refers to benzotriazole derivatives having no hydrogen atom or other substituent bound to nitrogen atom 2. Stated alternatively, the term "non-2H-substituted" includes the 1H and 3H tautomers of benzotriazole and derivatives of these tautomers in which there is a hydrogen atom or a substituent R bound to nitrogen atom 1 of 1H-benzotriazole or to nitrogen atom 3 of 3H-benzotriazole. 2H-Benzotriazole and derivatives of this tautomer in which there is a hydrogen atom or a substituent R bound to nitrogen atom 2 are not included. For example, 1-propargyl-1H-benzotriazole (structure (i), below) is a non-2H-substituted benzotriazole; therefore, it is within the definition of "unsaturated heterocyclic compounds," as that term is used herein. In contrast, 2-(2H-benzotriazol-2-yl)-4-methyl-6-(2-propenyl)phenol (structure (ii), below) is a 2H-sub stituted benzotriazole; therefore, it is not included in the definition of "unsaturated heterocyclic compounds".

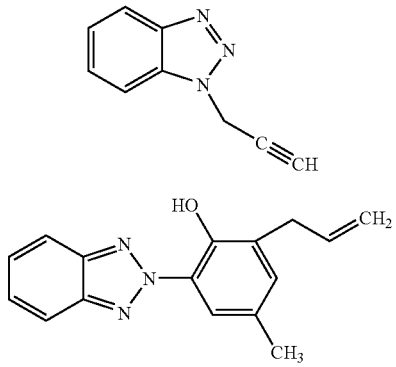

In summary, benzotriazole compounds are included in or excluded from the definition of "unsaturated heterocyclic compounds" based solely on their "non-2H substituted" structure. In this connection, the definition of "non-2H substituted" set forth above is not to be superceded by principles of nomenclature that may be inconsistent with the structural descriptions herein.

Accordingly, examples of suitable benzotriazole derivatives include, but are not limited to, 1-methyl-1H-benzotriazole, 5-methyl-1H-benzotriazole, 1-aminobenzotriazole, 4-hydroxy-1H-benzotriazole, 1-cyanobenzotriazole, 1H-benzotriazole-1-carboxaldehyde, 1,6-dimethyl-1H-1,2,3-benzotriazole, 1H-benzotriazole-1-methanol, 1-hydroxybenzotriazole hydrate, 5-chlorobenzotriazole, 1-propargyl-1H-benzotriazole, 1H-benzotriazol-1-ylmethyl isocyanide, 1H-benzotriazole-1-acetonitrile, 1-allylbenzotriazole, benzotriazole-1-carboxamide, benzotriazole-5-carboxylic acid, 1-(methoxymethyl)-1H-benzotriazole, 5,6-dimethyl-1H-benzotriazole monohydrate, 1-(chloromethyl)-1H-benzotriazole, 6-chloro-1-hydroxybenzotriazole dehydrate, 1-(2-methyl-allyl)-1H-benzotriazole, n-(1H-benzotriazol-1-ylmethyl)formamide, n,n-dimethylbenzotriazolemethanamine, 1H-1,2,3-benzotriazole-1-ylacetic acid, 1-methyl-5-nitro-1H-1,2,3-benzotriazole, 2-methyl-4-nitro-2H-1,2,3-benzotriazole, benzotriazole-1-carbonyl chloride, 1-(2-butenoyl)-1H-benzotriazole, 1-(trimethylsilyl)-1H-benzotriazole, 1-(alpha-chloroacetyl)-1H-benzotriazole, 1-(methylsulfonyl)-1H-benzotriazole, 1H-benzotriazole-4-sulfonic acid, 1-(1-ethoxy-2-propynyl)-1H-benzotriazole, (1-pyrrolidinylmethyl) benzotriazole, (1-ethoxy-2-propenyl) benzotriazole, 1-(2,2,2-trimethylacetyl)-1H-benzotriazole, benzotriazole-1-acetic ethyl ester, 3-(1H-1,2,3-benzotriazole-1-yl)propanohydrazide, 1-[(trimethylsilyl)methyl]benzotriazole, 5-aminobenzotriazole dihydrochloride, 5,6-dinitro-1H-benzotriazole, 1-benzyl-1H-benzotriazole, 1-(3-chloropropionyl)-1H-benzotriazole, 1-(2-pyrrolecarbonyl) benzotriazole, 1-(2-furoyl)-1H-benzotriazole, 1-(trifluoromethyl)acetylbenzotriazole, (4-morpholinyl-methyl)benzotriazole, 1-benzoyl-1H-benzotriazole, 1-(2-pyridylcarbonyl) benzotriazole, 1-(4-pyridylcarbonyl)benzotriazole, N-Phenylbenzotriazole-methanamine, 1-(phenoxymethyl)-1H-benzotriazole, 1-(9-amino-3H-(1,2,3)triazolo(4,5-f)quinolin-8-yl)ethanone, 2-benzotriazol-1-yl-ethanesulfonyl fluoride, 1-(2-thienylcarbonyl)-1H-benzotriazole, 1-(2,2-dichloroacetyl)-1H-benzotriazole, [1-(4-morpholinyl)ethyl]benzotriazole, benzotriazol-1-ylpyrrolidin-1-ylmethanethione, n-(1H-1,2,3-benzotriazol-1-ylmethyl)-3-methylaniline, alpha-methyl-n-phenyl-1H-benzotriazole-1-methanamine, N-(1H-1,2,3-benzotriazol-1-ylmethyl)-2-methylaniline, N-methyl-N-phenylbenzotriazolemethanamine, phenyl-1H-1,2,3-benzotriazole-5-carboxylate, 1-(benzoyloxy)-1H-1,2,3-benzotriazole, 3-(benzotriazol-1-ylmethoxy)-phenylamine, 1-(4-fluorobenzoyl)-1H-benzotriazole, 1-[(phenylthio)methyl]-1H-benzotriazole, [1-(4-morpholinyl)propyl]benzotriazole, 1-(3-phenyl-2-propenoyl)-1H-1,2,3-benzotriazole, n-(1H-benzotriazol-1-ylmethyl)benzamide, benzotriazol-1-ylmethyl-(2-ethyl-phenyl)-amine, n-(1H-1,2,3-benzotriazol-1-ylmethyl)-2,4-dimethylaniline, 4-(1H-1,2,3-benzotriazol-1-ylcarbonyl)phenyl methyl ether, 1-(benzyloxycarbonyl) benzotriazole, 2-benzotriazol-1-yl-n-pyridin-2-yl-acetamide, benzotriazol-1-ylmethyl-(2-methoxy-phenyl)-amine, n-(1H-1,2,3-benzotriazol-1-ylmethyl)-4-methoxyaniline, 1-O-tolylsulfanylmethyl-1H-benzotriazole, n'-(2-(1H-1,2,3-benzotriazole-1-yl)-1-methylethylidene)-2-cyanoacetohydrazide, methyl 3-(1H-1,2,3-benzotriazol-4-yl (methyl) amino)-2-cyanoacrylate, 1-(4-chlorobenzoyl)-1H-benzotriazole, n-(1H-1,2,3-benzotriazol-1-ylmethyl)-2-chloro-aniline, benzotriazol-1-ylmethyl-(3-chloro-phenyl)-amine, n-(1H-1,2,3-benzotriazol-1-ylmethyl)-4-chloro-aniline, 1-(phenylsulfonyl)-1H-benzotriazole, and benzotriazol-1-ylmethyl-(2,5-difluoro-phenyl)-amine.

Examples of suitable 1,2,3-triazole derivatives include, but are not limited to, 5-nitro-1H-1,2,3-triazole, 1H-1,2,3-triazolo[4,5-b]pyridine, 1-hydroxy-7-azabenzotriazole solution, 3H-(1,2,3)triazolo(4,5-d)pyrimidin-7-ylamine, 8-azaadenine, 8-azaguanine, 8-azaxanthine monohydrate, 1,2,3-triazole-4,5-dicarboxylic acid, n-phenyl-1H-1,2,3-triazol-5-amine, 1-acetyl-1H-1,2,3-triazolo[4,5-b]pyridine, 3-methyl-8-azaguanine, 3H-1,2,3,4,5,7,7a-heptaaza-s-indacen-8-ol, 4,6-dimethyl-1H-v-triazolo(4,5-d)pyrimidine-5,7(4H,6H)-dione, 1,2,3-triazole-4,5-dicarboxylic acid, monopotassium salt of 1,2,3-triazole-4,5-dicarboxylic acid, 5-amino-1,4-diphenyl-1,2,3-triazole, 5-anilino-4-phenyl-1H-1,2,3-triazole, and rufinamide.

Examples of suitable 1,2,4-triazole derivatives include, but are not limited to, 3-amino-1,2,4-triazole, 1H-1,2,4-triazol-5-amine, 1,2,4-triazolylsodium, 1-vinyl-1,2,4-triazole, 3,5-diamino-1,2,4-triazole, 1H-1,2,4-triazole-3-thiol, 1,2,4-triazole-3-carboxylic acid, 3-nitro-1H-1,2,4-triazole, 3-amino-1,2,4-triazole-5-thiol, 1,2,4-triazolo[1,5-a]pyrimidine, 3-acetamido-1H-1,2,4-triazole, methyl-1H-1,2,4-triazole-3-carboxylate, 5-amino-4H-(1,2,4)triazole-3-carboxylic acid, 5-amino-1H-(1,2,4)triazole-3-carboxylic acid, 3-amino-1H-1,2,4-triazole-5-carboxylic acid, 3-amino-5-methylthio-1H-1,2,4-triazole, 5-methyl-s-triazolo (1,5-a)pyrimidine, 1-trimethylsilyl-1,2,4-triazole, 5-amino-1H-[1,2,4]-triazole-3-carboxylic acid methyl ester, 3-methyl-5-(2-oxido-2-oxohydrazino)-1H-1,2,4-triazole, 3-amino-1,2,4-triazole-5-carboxylic acid hydrate, 1H-1,2,4-triazole-1-carboxamidine hydrochloride, 5,7-dimethyl-s-triazolo[1,5-a]pyrimidine, 7-hydroxy-5-methyl[1,2,4]triazolo[1,5-a]pyrimidine, 5-methyl(1,2,4)triazolo(4,3-a)pyrimidin-7-ol, 7-amino-s-triazolo (1,5-a)pyrimidin-5(4H)-one, 5-(trifluoromethyl)-4H-1,2,4-triazol-3-ylamine, oxo(1H-1,2,4-triazol-5-ylamino)acetic acid, 3-(1,2,4-triazol-1-yl)-L-alanine, 5-amino-1H-(1,2,4) triazole-3-carboxylic acid ethyl ester, beta-(1,2,4-triazol-3-yl)-DL-alanine, 1-amino-5-propyl-1H-1,2,4-triazol-3-yl hydrosulfide, 2-(2-aminophenyl)-1H-1,3,4-triazole, 2-chloro-n-(4H-(1,2,4)triazol-3-yl)-acetamide, (5-dihydroxymethyl-2H-(1,2,4)triazol-3-yl)-methanediol, 1,1'-carbonyl-di-(1,2,4-triazole), 5,5'-dimethyl-1H,1'H-(3,3')BI((1,2,4)triazolyl), 1H,1'H-(3,3')BI((1,2,4)triazolyl)-5,5'-diamine, 2H,2'H-(3,3')BI((1,2,4)triazolyl)-5,5'-diamine, 3,3'-bis(5-amino-4H-1,2,4-tria), 3-OXO-N-(1H-1,2,4-triazol-5-yl)butanamide, 7-chloro-5-methyl-(1,2,4)triazolo(1,5-a)pyrimidine, 1-(tert-butoxycarbonyl)1H-1,2,4-triazole, s-triazolo(4,3-a)quinoline, 6,7,8,9-tetrahydro-5H-(1,2,4) triazolo (1,5-a)azepin-2-yl hydrosulfide, 2-(3-nitro-(1,2,4) triazol-1-yl)-acetamide, (3-nitro-(1,2,4)triazol-1-yl)-acetic acid, benzylidene-(1,2,4)triazol-4-Y, 4-(benzylideneamino)-4H-1,2,4-triazole, n-(4-pyridinylmethylene)-4H-1,2,4-triazol-4-amine, (4-methyl-4H-(1,2,4)triazol-3-ylsulfanyl)-acetic acid, 3-methylamino-5-phenyl-1,2,4-triazole, 3-(3-pyridylmethylamino)-1,2,4-triazole, (1,2,4)triazolo (3,4-B) (1,3)benzothiazole, 3H-1,2,3,4,5,7,7A-heptaaza-S-indacen-8-OL, 1-phenyl-1H-(1,2,4)triazole-3-thiol, 5-phenyl-1H-1,2, 4-triazole-3-thiol, 5-propyl-(1,2,4)triazolo (1,5-A) pyrimidin-7-OL, 5-(4-pyridyl)-1H-1,2,4-triazole-3-thiol, 6-nitro-(1,2,4)triazolo (1,5-A)pyrimidin-2-ylamine, 5-((5-amino-4H-1,2,4-triazol-3-yl)methyl)-4H-1,2,4-triazol-3-ylamine, 3-((5-amino-1H-1,2,4-triazol-3-yl)methyl)-1H-1,2, 4-triazol-5-ylamine, 5,7-dimethyl-(1,2,4)triazolo (1,5-A) pyrimidine-2-thiol, hydrochloride of 3-phenyl-4H-(1,2,4) triazole, 3-mercapto-5-methyl-8H-(1,2,4)triazolo(4,3-A) pyrimidin-7-one, 5-amino-1H-(1,2,4)triazole-3-carboxylic acid butyl ester, and 3-(4-pyridinyl)-6,7-dihydro-5H-pyrrolo (2,1-C)(1,2,4)triazole.

Examples of suitable imidazoles include, but are not limited to, 2-methyl-2-imidazoline, 2-phenyl-2-imidazoline, 3-(4,5-dihydro-2-imidazolyl)pyridine, 8-methyl-2,3,7,8-tetrahydroimidazo(1,2-A)pyrimidin-5(6H)-one, (4,5-dihydro-1H-imidazol-2-ylthio)acetic acid, 2-benzylimidazoline, 4-(4, 5-dihydro-1H-imidazol-2-yl)phenylamine, 2-(4,5-dihydro-1H-imidazol-2-yl)phenol, 4-(4,5-dihydro-1H-imidazol-2-yl) phenol, 3-(4,5-dihydro-1H-imidazol-2-yl)phenol, 2-chloro-1,3-dimethylimidazolidinium chloride, 3A,4,5,6,7,7A-hexahydro-1H-benzimidazol-2-yl methyl sulfide, hydrochloride of imidazo(1,2-A)pyridin-2-one, 2,3-dihydro-5H-imidazo(2,1-A)isoindol-5-one, 2-amino-5,5-bis(hydroxymethyl)-1-methyl-1,5-dihydro-4H-imidazol-4-one, 4-(4-methyl-4,5-dihydro-1H-imidazol-2-yl)phenylamine, 4-(4-methyl-4,5-dihydro-1H-imidazol-2-yl)phenol, 2-(4-methyl-4,5-dihydro-1H-imidazol-2-yl)phenol, 3-(4-methyl-4,5-dihydro-1H-imidazol-2-yl)phenol, 2-amino-1-methyl-2-imidazoline hydrobromide, 2-mercapto-3-phenyl-3,5-dihydro-imidazol-4-one, 2-(4-methoxystyryl)-2-imidazoline, 2,10-dihydro-10-ethylimidazo(2,1-B) quinazoline-5(3H)-one, 2-methyl-4,5-dihydro-imidazole-1-carbothioic acid phenylamide, 2-chloro-1,3-dimethylimidazolidinium tetrafluoroborate, 2-(4-bromophenyl)-4,5-dihydro-1H-imidazole, 2-(methylamino)-2-midazoline hydriodide, 2-(3-nitrophenyl)-4,5-dihydro-1H-imidazole hydrochloride, 2-(4,5-dihydro-1H-imidazol-2-yl)quinoline hydrochloride, 5-butoxy-2-(4,5-dihydro-1H-imidazol-2-yl)phenol, 3-(1,3-dimethyl-2, 6-dioxo-1,2,3,4,5,6-hexahydro-9H-purin-9-yl) propanenitrile, tetrahydrozoline hydrochloride, idazoxan hydrochloride, tetramisole hydrochloride, levamisol hydrochloride, 1,3-diisopropylimidazolinium tetrafluoroborate, 2-(4,5-dihydro-1H-imidazol-2-yl)-1-benzofuran-5-yl thiocyanate, 2-methylthio-2-imidazoline hydriodide, 4,5-dihydro-1H-imidazol-2-yl-fluorobenzyl sulfide hydrochloride, naphazoline hydrochloride, 4-chloro-alpha-(2-imidazolin-2-yl)benzyl alcohol hydrochloride, 5A, 11A-dihydronaphtho [2',3':4,5]imidazo[1,2-A]pyridine-6,11-dione, 2,3,6,7-tetrahydro-5,7,7-trimethyl-5H-pyrrolo(1,2-a)imidazole, 3-(4, 5-dihydro-1H-imidazol-2-yl)aniline dihydrochloride hydrate, efaroxan hydrochloride, cirazoline hydrochloride, 1-bityl-4,5-dihydro-3-ethyl-8-hydroxyxanthine, imidacloprid solution, 2-(4-fluorobenzylidene)-2,5,6,7,8,9-hexahydro-3H-imidazo(1,2-a)azepin-3-one, imidacloprid-d4, imazapyr, 9-benzyl-2-chloro-5,9-dihydro-4H-purin-6-ylamine, 2-fluoro-1,3-dimethylimidazolidinium hexafluorophosphate, 2-(4,5-dihydro-1H-imidazol-2-yl)-5-(hexyloxy) phenol, 3-phenyl-2-(4-toluidino)-3,5-dihydro-4H-imidazol-4-one, clonidine hydrochloride, n-(3-chlorophenyl)-n'-(1-methyl-4-oxo-4,5-dihydro-1H-imidazol-2-yl)urea, 2,4,5-tri-(2-furyl)-2-imidazoline, 5-(benzyloxy)-2-(4,5-dihydro-1H-imidazol-2-yl)phenol, 1,3-ditert-butyl-4,5-dihydro-1H-imidazol-3-ium tetrafluoroborate, n-allyl-n-(2,6-dichlorophenyl)-4,5-dihydro-1H-imidazol-2-amine, 2-(4,5-dihydro-1H-imidazol-2-yl)-2,3-dihydro-1,4-benzodioxin-2-yl methyl ether hydrochloride, 2-(4,5-dihydro-1H-imidazol-2-yl)-2,3-dihydro-1,4-benzodioxin-2-yl methyl ether, 3-(3,4-dihydroxyphenyl)-5,6-dihydroimidazo(2,1-B)thiazole hydrochloride, 2-methyl-n-(3-(trifluoromethyl)phenyl)-2-imidazoline-1-carboxamide, nitric acid compound with 2-(1-naphthylmethyl)-4,5-dihydro-1H-imidazole (1:1), 2-benzyl-2-imidazoline thiosulfate, 1-[3-(triethoxysilyl)propyl]-4,5-dihydro-1H-imidazole, 2-(4-isopropyl-4-methyl-5-oxo-4,5-dihydro-1H-imidazol-2-yl)-5-methylnicotinic acid, 2-[(E)-2-(2-methylphenyl)ethenyl]-4,5-dihydro-1H-imidazole ethanedioate nonahydrochloride, 6,6-diphenyl-2,3,6,7-tetrahydro-5H-pyrrolo(1,2-a)imidazol-5-one, 10-benzyl-2,3-dihydroimidazo(2,1-b)quinazolin-5(10H)-one, n-(4-chloro-6-methoxy-2-methyl-5-pyrimidinyl)-n-(4,5-dihydro-1H-imidazol-2-yl)amine hydrochloride, n-(4-chloro-6-methoxy-2-methyl-5-pyrimidinyl)-n-(4,5-dihydro-1H-imidazol-2-yl) amine hydrochloride, 2-chloro-1,3-dimethyl-4,5-dihydro-1H-imidazol-3-ium hexafluorophosphate, 2,3,5,6,7,8-hexahydro-8-methylimidazo (1,2-a)pyrimidin-5-imine hydriodide, 3,7-dimethyl-1-(5-oxo-hexyl)-3,7-dihydro-purine-2,6-dione, 3,7-dimethyl-1-(5-oxohexyl)-3,7-dihydro-1H-purine-2,6-dione, 2-(4-tert-butyl-2,6-dimethylbenzyl)-4, 5-dihydro-1H-imidazole hydrochloride, 8-methyl-2,3,7,8-tetrahydroimidazo(1,2-a)pyrimidin-5(6H)-one hydriodide, 2,6-dichloro-N(1)-(4,5-dihydro-1H-imidazol-2-yl)-1,4-benzenediamine hydrochloride, 3-(4-chlorophenyl)-2-ethyl-2,3, 5,6-tetra-hydroimidazo(2,1-b)thiazol-3-ol, 5-(4-chlorophenyl)-2,5-dihydro-3H-imidazo[2,1-a]isoindol-5-ol, 2-(4-nitrobenzylidene)-2,5,6,7,8,9-hexahydro-3H-imidazo(1,2-a) azepin-3-one, 2-(2-nitrobenzylidene)-2,5,6,7,8,9-hexahydro-3H-imidazo(1,2-a)azepin-3-one, 9,13b-dihydro-1H-dibenzo[c,f]imidazo[1,5-a]azepin-3-ylamine hydrochloride, 2-(4,5-dihydro-1H-imidazol-2-ylthio)-n-(4-methylphenyl)acetamide hydrochloride, 2-(4,5)-dihydro-1H-imidazol-2-ylthio)-n-(2-methylphenyl)acetamide hydrochloride, methyl 2-(4-isopropyl-4-methyl-5-oxo-4,5-dihydro-1H-imidazol-2-yl)-4-methylbenzoate, hydrobromide of 3-thiophen-2-yl-5,6-2H-imidazo(2,1-B) thiazole, 5-ethyl-2-(4-isopropyl-4-methyl-5-oxo-4,5-dihydro-1H-imidazol-2-yl)nicotinic acid, n-(5-chloro-2,1,3-benzothiadiazol-4-yl)-n-(4,5-dihydro-1H-imidazol-2-yl)amine hydrochloride, 2-(4,5-dihydro-1H-imidazol-2-yl)-5-(octyloxy)phenol, 5-bromo-N-(4,5-dihydro-1H-imidazol-2-yl)-6-quinoxalinamine, 5-benzylidene-2-methylsulfanyl-3-phenyl-3,5-dihydro-imidazol-4-one, 5-benzylidene-2-mercapto-3-(2-methylphenyl)-3,5-dihydro-4H-imidazol-4-one, 6-tert-butyl-3-(4,5-dihydro-1H-imidazol-2-ylmethyl)-2,4-dimethylphenol hydrochloride, and DL-isoamarine.

Examples of suitable pyrrole derivatives include, but are not limited to, 1H-pyrrole-d5, 1-methyl-1H-pyrrole, 3-methyl-1H-pyrrole, 1H-pyrrole-2-carbonitrile, 1H-pyrrole-2-carbaldehyde, 2,5-dimethyl-1H-pyrrole, 2-ethyl-1H-pyrrole, 2,4-dimethyl-1H-pyrrole, 1-(1H-pyrrol-2-yl)ethanone, 1-methyl-1H-pyrrole-2-carbaldehyde, 1,2,5-trimethyl-1H-pyrrole, 1H-pyrrole-2-carbaldehydeyde oxime, N,N-dimethyl-1H-pyrrol-1-amine, 1H-pyrrole-2-carboxylic acid, 1H-indole, 1H-pyrrolo[2,3-b]pyridine, 1,5-dimethyl-1H-pyrrole-2-carbonitrile, 3-(1H-pyrrol-1-yl)propanenitrile, 3-(1H-pyrrol-2-yl)-2-propenal, 4,5,6,7-tetrahydro-1H-indole, 1H-pyrrole-2,5-dicarbaldehyde, 1-(1-methyl-1H-pyrrol-2-yl)ethanone, 3,5-dimethyl-1H-pyrrole-2-carbaldehyde, 1-(1-methyl-1H-pyrrol-3-yl)ethanone, 1-(4-methyl-1H-pyrrol-3-yl)ethanone, 3-ethyl-2,4-dimethyl-1H-pyrrole, 1-(1H-pyrrol-2-yl)ethanone oxime, 1H-indole-d7, methyl 1H-pyrrole-1-carboxylate, 1-methyl-1H-pyrrole-2-carboxylic acid, 2,3-dihydro-6H-[1,4]dioxino[2,3-c]pyrrole, methyl 1H-pyrrole-3-carboxylate, methyl 1H-pyrrole-2-carboxylate, 3-chloro-1H-pyrrole-2-carbaldehyde, 4-methyl-1H-indole, 2-methyl-1H-indole, 3-methyl-1H-indole, 1-methyl-1H-indole, 5-methyl-1H-indole, 7-methyl-1H-indole, 6-methyl-1H-indole, 1H-indol-5-amine, 1H-indol-7-amine, 1H-indol-6-amine, 1H-indol-4-amine, 1H-indol-4-ol, 1H-indol-5-ol, 1H-indol-6-ol, 5-fluoro-1H-indole, 4-fluoro-1H-indole, 6-fluoro-1H-indole, 1,5,6,7-tetrahydro-4H-indol-4-one, 4-(1H-pyrrol-2-yl)-3-buten-2-one, formic acid (2-pyrrolylmethylene)hydrazide, 1-(2,4-dimethyl-1H-pyrrol-3-yl)ethanone, 1-(4-ethyl-1H-pyrrol-3-yl)ethanone, ethyl 1H-pyrrole-2-carboxylate, 2-methyl-2,3-dihydro-6H-[1,4]dioxino[2,3-c]pyrrole, 3-(1H-pyrrol-1-yl)propanoic acid, 2-(1H-pyrrol-2-yl)acetohydrazide, 1H-indole-4-carbonitrile, 1H-indole-5-carbonitrile, 2-(1H-pyrrol-2-ylmethylene)malononitrile, 1-phenyl-1H-pyrrole, 1H-indole-3-carbaldehyde, 1H-indole-5-carbaldehyde, 1H-indole-7-carbaldehyde, 1H-indole-2-carbaldehyde, 1H-indole-4-carbaldehyde, 1H-indole-6-carbaldehyde, 2,5-dimethyl-1H-indole, 1,3-dimethylindole, 1,2-dimethyl-1H-indole, 7-ethyl-1H-indole, 2,3-dimethyl-1H-indole, 3-chloro-1H-pyrrole-2-carboxylic acid, 1H-pyrrolo[2,3-b]pyridine-3-carbaldehyde, 2-(1H-pyrrol-2-ylmethyl)-1H-pyrrole, 1H-indol-5-ylmethanamine, 2-methyl-1H-indol-5-amine, 1H-indol-3-ylmethanol, 1H-indol-5-yl methyl ether, 1H-indol-2-ylmethanol, 1H-indol-7-yl methyl ether, 1H-indol-6-yl methyl ether, 1H-indol-4-yl methyl ether, 1-(2-furylmethyl)-1H-pyrrole, 5-formyl-3,4-dimethyl-1H-pyrrole-2-carbonitrile, methyl 1H-pyrrolo[2,3-c]pyridin-5-yl ether, methyl 7H-pyrrolo(2,3-d)pyrimidin-4-yl ether, 2-methyl-7H-pyrrolo (2,3-d)pyrimidin-4-ol, 5-fluoro-2-methyl-1H-indole, H-pyrrol-2-yl)-1-penten-3-one, 2-amino-7H-pyrrolo[2,3-d]pyrimidin-4-ol, 2,5-dimethyl-1H-pyrrole-3,4-dicarbaldehyde, 3-(1H-pyrrol-3-yl))acrylic acid methyl ester, and 3,4-dimethyl-2,5-pyrroledicarboxaldehyde.

Examples of suitable pyrazine derivatives include, but are not limited to, pyrazine-d4, 2-methylpyrazine, 2-pyrazinamine, 2-pyrazinecarbonitrile, 2,3-dimethylpyrazine, 2-ethylpyrazine, 2,5-dimethylpyrazine, 2,6-dimethylpyrazine, 2-methoxypyrazine, 2-chloropyrazine, sodium salt of pyrazinol, imidazo[1,2-a]pyrazine, 1-(2-pyrazinyl)ethanone, 2-ethyl-3-methylpyrazine, 2,3,5-trimethylpyrazine, 2-pyrazinecarboxamide, 2-pyrazinecarboxylic acid, 2-methoxy-3-methylpyrazine, 2-(methylsulfanyl)pyrazine, 2,3-pyrazinedicarbonitrile, quinoxaline, 5,6,7,8-tetrahydroquinoxaline, 5-methyl-6,7-dihydro-5H-cyclopenta[b]pyrazine, 1-(3-methyl-2-pyrazinyl)ethanone, 2,3,5,6-tetramethylpyrazine, 2,3-diethylpyrazine, methyl 2-pyrazinecarboxylate, 5-methyl-2-pyrazinecarboxylic acid, 2-ethyl-3-methoxypyrazine, 2-ethoxy-3-methylpyrazine, 3-amino-2-pyrazinecarboxylic acid, 5-hydroxy-2-pyrazinecarboxylic acid, 2-methyl-3-(methylsulfanyl)pyrazine, 2-(2-pyrazinyl)ethanethiol, 3-chloro-2,5-dimethylpyrazine, 5-methyl-2,3-pyrazinedicarbonitrile, 2-methylquinoxaline, 5-methylquinoxaline, 2-quinoxalinol, 2,6-dichloropyrazine, 2,3-dichloropyrazine, furo[3,4-b]pyrazine-5,7-dione, 1-(3-ethyl-2-pyrazinyl)ethanone, 1-(3,5-dimethyl-2-pyrazinyl)ethanone, 2,3-diethyl-5-methylpyrazine, 2-isobutyl-3-methylpyrazine, 2-(2-(dimethylamino)ethyl)pyrazine, 2-isopropyl-3-methoxypyrazine, 2-methyl-6-propoxy-pyrazine, methyl 3-amino-2-pyrazinecarboxylate, 5,6-dimethyl-2,3-pyrazinedicarbonitrile, 2,3-dimethylquinoxaline, 6,7-dimethylquinoxaline, 2,3-dimethylpyrido (2,3-b)pyrazine, 5,6-diamino-2,3-pyrazinedicarbonitrile, 6,7-dimethylpteridine, 2,3-quinoxalinediol, pyrido[2,3-b]pyrazine-2,3-diol, 2-amino-4(3H)-pteridinone, 2,4-pteridinediol, 3-hydroxy-5,6-dimethyl-1H-pyrazolo-(3,4b)-pyrazine, 2-chloroquinoxaline, 2,3-pyrazinedicarboxamide, 2-isobutyl-3-methoxypyrazine, 2-sec-butyl-3-methoxypyrazine, 2,3-pyrazinedicarboxylic acid, quinoxaline-2-carbaldehyde oxime, 2-quinoxalinecarboxylic acid, 2-methylquinoxaline-1,4-dioxide, 4-hydroxy-6,7-dimethylpteridine, hydrate of 2,3-dimethyl-quinoxaline, isoxanthopterin, phenazine, 3-amino-6-(chloromethyl)-2-pyrazinecarbonitrile 4-oxide, n-methyl-n'-quinoxalin-2-ylmethylene-hydrazine, 2,3-diethylquinoxaline, 2,3,6,7-tetramethylquinoxaline, 1-(3,5-diamino-6-chloro-2-pyrazinyl)ethanone, 3,5-diamino-6-chloro-2-pyrazinecarboxamide, 2-hydroxy-3,6,7-trimethylquinoxaline, 1,2,3,4,6,7,8,9-octahydrophenazine, 5-bromo-2,3-pyrazinediamine, 2-(nitromethyl)quinoxaline, 3-hydroxy-2-quinoxalinecarboxylic acid, 6,7-dimethyl-2,3-quinoxalinediol, 2,4-diamino-6,7-dimethylpteridine, 2-amino-6,7-dimethyl-4-pteridinol, 6,7-dimethyl-2,4-pteridinediol, (2,4-diamino-6-pteridinyl)methanol, 2-quinoxalinecarbonyl chloride, 2-amino-6-methyl-4,7-pteridinediol, 2-amino-1,5-dihydro-4,6-pteridinedione hydrate, 3-bromoimidazo[1,2-a]pyrazine, 2,6-dichloroquinoxaline, 2,3-dichloroquinoxaline, and ethyl 2-quinoxalinecarboxylate.

Examples of suitable pyrimidine derivatives include, but are not limited to, 4-methylpyrimidine, 5-methylpyrimidine, 2-methylpyrimidine, 4-pyrimidinamine, 5-pyrimidinamine, pyrimidine 1-oxide, 2-pyrimidine-carbonitrile, 4,6-dimethylpyrimidine, 4-methyl-2-pyrimidinamine, 4,5-pyrimidinediamine, 2,4-pyrimidinediamine, 4,6-pyrimidinediol, 2,4-dihydroxypyrimidine, 2-pyrimidinethiol, 5-fluoro-2-pyrimidinol, 5-fluoro-pyrimidin-4-ol, 2-chloropyrimidine, 2,4-difluoropyrimidine, 9H-purine, 4-amino-5-pyrimidinecarbonitrile, n-(2-pyrimidinyl)-formamide, 4,6-dimethyl-2-pyrimidinamine, 2,6-dimethyl-4-pyrimidinol, 4,6-diamino-2-methylpyrimidine, 2-amino-6-methyl-4-pyrimidinol, 4-amino-6-hydroxy-2-methylpyrimidine, 6-methoxy-4-pyrimidinamine, 2,4,6-pyrimidinetriamine, 6-methyl-2,4(1H,3H)-pyrimidinedione, 2-methyl-4,6-pyrimidinediol, 6-methyl-pyrimidine-4,5-diol, 5-methyl-4,6-pyrimidinediol, 2,6-diamino-4-pyrimidinol, 6-hydrazino-4-pyrimidinol, 6-methyl-4-pyrimidinethiol, 2-amino-4,6-pyrimidinediol, dihydro-2,4,5(3H)-pyrimidinetrione, 5-fluoro-6-methyl-pyrimidin-4-ol, 2-thioxo-2,3-dihydro-4(1H)-pyrimidinone, 4-sulfanyl-2-pyrimidinol, 2-chloro-4-pyrimidinamine, 5-chloro-2-pyrimidinamine, 5-fluoro-pyrimidine-4-thiol, quinazoline, 2-chloro-5-fluoropyrimidine, 2-pyrimidinol hydrochloride, 4,5,6-trifluoropyrimidine, 2-amino-6-methyl-4(3H)-pteridinone, 4-amino-2-methyl-pyrimidine-5-carbonitrile, 6-methyl-9H-purine, 1H-pyrazolo[3,4-d]pyrimidin-4-amine, 7H-purin-2-amine, 9H-purin-6-amine, 5-cyano-2,4-diaminopyrimidine, 9H-purin-6-amine, 1,5-dihydro-4H-pyrazolo[3,4-d]pyrimidin-4-one, 3H-(1,2,3)triazolo(4,5-d)pyrimidin-7-ylamine, 1H-[1,2,3]triazolo[4,5-d]pyrimidin-7-amine, 9H-purin-6-amine, 2-acetamidopyrimidine, methyl 5-pyrimidinecarboxylate, 4,6-diamino-5-nitrosopyrimidine, 2-amino-5,6-dimethyl-4-pyrimidinol, 4-methoxy-6-methyl-2-pyrimidinamine, 6-hydroxy-4-pyrimidinecarboxylic acid, 5-nitro-2-pyrimidinamine, 5,6-dimethyl-2,4(1H,3H)-pyrimidinedione, 5-methyoxy-2-methyl-pyrimidin-4-ol, 2,4-dimethoxypyrimidine, 5-amino-4-hydroxy-6-(methylamino) pyrimidine, 4,6-dimethyl-2-pyrimidinethiol, 4-methyl-2-(methylsulfanyl)pyrimidine, 2-amino-4,6-dihydroxy-5-methylpyrimidine, 2-amino-5-methyoxy-pyrimidin-4,5-amino-2,4-dihydroxy-6-methylpyrimidine, 4-amino-2-hydroxy-5-(hydroxymethyl) pyrimidine, 2-amino-6-methyl-4,5-pyrimidinediol, 4-amino-2-mercapto-6-methylpyrimidine, 6-methyl-2-thioxo-2,3-dihydro-4(1H)-pyrimidinone, 2-methylsulfanyl-pyrimidin-5-ol, 2-methylsulfanyl-pyrimidin-4-ol, 2,4-diamino-6-mercaptopyrimidine, 4,5-diamino-2-mercaptopyrimidine, 2-chloro-5-ethylpyrimidine, 6-amino-5-fluoro-2-methyl-pyrimidin-4-ol, 4-amino-2-hydroxy-6-mercaptopyrimidine, 4-chloro-6-methyl-2-pyrimidinamine, 2-thioxodihydro-4,6(1H,5H)-pyrimidinedione, 2-chloro-5-methoxypyrimidine, 2-chloro-4-methoxypyrimidine, 6-chloro-2-methyl-4-pyrimidinol, 6-chloro-2,4-pyrimidinediamine, 7H-purine-6-carbonitrile, 5-fluoro-6-fluoromethyl-pyrimidin-4-ol, 4(3H)-quinazolinone, and 4-methyl-2(1H)-pyrimidinone hydrochloride.

Examples of suitable pyridine derivatives include, but are not limited to, 2-methylpyridine, 3-methylpyridine, 4-methylpyridine, 2-pyridinamine, 4-pyridinamine, 3-pyridinamine, pyridine 1-oxide, 2-pyridinol, 3-pyridinol, 4(1H)-pyridinone, 4-methylpyridine-d3, 2-fluoropyridine, 3-fluoropyridine, pyridine hydrofluoride, 2-pyridinamine-d6, 2-methylpyridine-d7, 2-ethynylpyridine, 2-pyridinecarbonitrile, nicotinonitrile, isonicotinonitrile, 2-vinylpyridine, 4-vinylpyridine, 2-pyridinecarbaldehyde, nicotinaldehyde, isonicotinaldehyde, 2,5-dimethylpyridine, 4-ethylpyridine, 2,3-dimethylpyridine, 3,4-dimethylpyridine, 3-ethylpyridine, 2-ethylpyridine, 2,4-dimethylpyridine, 3,5-dimethylpyridine, 2,6-dimethylpyridine, N-methyl-N-(4-pyridinyl)amine, N-methyl-N-(2-pyridinyl)amine, 2-methyl-3-pyridinamine, 4-pyridinylmethanamine, 2-methyl-4-pyridinamine, 3-methyl-2-pyridinamine, 4-methyl-2-pyridinamine, 5-methyl-3-pyridinamine, 3-pyridinylmethanamine, 2-pyridinylmethanamine, 5-methyl-2-pyridinamine, 6-methyl-2-pyridinamine, 6-methyl-3-pyridinamine, 4-methyl-3-pyridinamine, 2-methyl-4-pyridinamine, 3-methyl-2(1H)-pyridinone, 4-methoxypyridine, 5-methyl-2-pyridinol, 2-methoxypyridine, 6-methyl-2-pyridinol, 3-pyridinylmethanol, 2-pyridinylmethanol, 6-methyl-3-pyridinol, 4-methyl-2-pyridinol, 4-pyridinylmethanol, 3-methoxypyridine, 2-methyl-3-pyridinol, 2,5-pyridinediamine, 2-hydrazinopyridine, 2,3-pyridinediamine, 3,4-pyridinediamine, 2,6-pyridinediamine, 2-amino-3-pyridinol, 2,4-pyridinediol, 2,3-pyridinediol, 2-fluoro-3-methylpyridine, 2-fluoro-6-methylpyridine, 2-fluoro-5-methylpyridine, 2-fluoro-4-methylpyridine, 2-pyridinethiol, 4-pyridinethiol, 5-fluoro-2-pyridinamine, 3-chloropyridine, 2-chloropyridine, 2,6-difluoropyridine, pyridine hydrochloride, 4-methyl-2-pyridinecarbonitrile, 6-methyl-2-pyridinecarbonitrile, 3-methyl-2-pyridinecarbonitrile, 1H-pyrrolo[2,3-b]pyridine, 3-pyridinylacetonitrile, 2-pyridinylacetonitrile, 5-methylnicotinonitrile, 1H-imidazo[4,5-b]pyridine, and 2-aminonicotinonitrile.

Examples of suitable pyridizine derivatives include, but are not limited to, 3-methylpyridazine, 4-methylpyridazine, 3-pyridazinamine, pyridazine 1-oxide, 1,2-dihydro-3,6-pyridazinedione, 3,6-pyridazinediol, 4-pyridazinecarboxylic acid, 4-methyl-3,6-pyridazinediol, 3-chloro-6-methylpyridazine, 3-chloro-6-methoxypyridazine, 3-chloro-6-hydrazinopyridazine, 4-chloro-3,6-dihydroxypyridazine, 3,6-dichloropyridazine, 3,6-dichloropyridazine, 3-chloro-6-ethoxypyridazine, 6-chloro-3-methoxy-4-pyridazinamine, phthalazine-1,4-diamine, 3-chloro-6-(methylthio)pyridazine, 3,6-dichloro-4-methylpyridazine, 3,6-dichloro-4-pyridazinamine, 1-chlorophthalazine, 3-amino-5,6-dimethyl-4-pyridazinecarboxamide, cinnoline hydrochloride hydrate, 3-chloro-5,6-dimethyl-4-pyridazinecarbonitrile, 4-cinnolinecarboxylic acid, 5-amino-1,4-phthalazinediol, 1,4,5-trimethyl-1H-pyrazolo[3,4-c]pyridazin-3-amine, 3,6-dichloro-N-methyl-4-pyridazinamine, 5-chloro-8-methyl-phthalazine, benzo(C)cinnoline, 3-chloro-6-phenylpyridazine, 3-chloro-6-(methylsulfonyl)pyridazine, 3,6-dichloro-4-pyridazinecarboxylic acid, 6-amino-1,4-phthalazinediol hydrate, 1,4-dichlorophthalazine, 4-amino-3-methyl-6-nitrocinnoline, 3-chloro-6-methyl-4-phenylpyridazine, N-(3,6-dichloro-4-pyridazinyl)acetamide, 1-ethoxyphthalazine hydrochloride, 1,2,3,6,7,8-hexahydrocinnolino (5,4,3-CDE)cinnoline, 3-chloro-6-(4-methoxyphenyl)pyridazine, acetone O-(6-{[(1-methylethylidene)amino]oxy}-3-pyridazinyl)oxime, 4-((6-methoxy-3-pyridazinyl)amino)-4-oxo-2-butenoic acid, 4-styrylcinnoline, 3,6-diphenylpyridazine, 1-methyl-3H-benzo(H)pyrazolo(4,3-C)cinnoline, 1-chloro-4-phenylphthalazine, 8-chloro-4-hydroxy-3-cinnolinecarboxylic acid hydrate, 6-(phenylsulfinyl) tetraazolo[1,5-b]pyridazine, 6-methyl-3,4-diphenylpyridazine, 4-methyl-3,6-diphenylpyridazine, 4,5-dimethyl-N-[(E)-phenylmethylidene]-1H-pyrazolo[3,4-c]pyridazin-3-amine, 3,4,7-trimethyl-2-P-tolyl-2H-pyrazolo(3,4-D)pyridazine, 1,2,5,6-tetrathia-3,4,7,8-tetraazacyclopenta (FG) acenaphthylene, cyclopentanone (4-chloro-1-phthalazinyl) hydrazone, 3,6-bis(1,1,2,2-tetramethylpropyl)pyridazine, 3-methyl-6-[3-(trifluoromethyl) phenyl][1,2,4]triazolo[4,3-b]pyridazine, 3,4-dihydro-1(2H)-naphthalenone (1,2,4)triazolo(4,3-B)pyridazin-6-ylhydrazone, 4-amino-N-(6-methoxy-3-pyridazinyl)benzenesulfonamide, 1,4-dihydrazinophthalazine dihydro-chloride monohydrate, benzaldehyde (4-chloro-1-phthalazinyl)hydrazone, nicotinaldehyde (4-chloro-1-phthalazinyl)hydrazone, 4-amino-N-(6-chloro-3-pyridazinyl)benzenesulfonamide, 1-(3-hydroxy-5,6-diphenyl-4-pyridazinyl)ethanone, 2-(6-chloropyridazin-3-yl)-hydrazonomethyl)-4-nitro-phenol, 2-((6-chloro-pyridazin-3-yl)-hydrazonomethyl)-6-nitro-phenol, 4-amino-N-(6-ethoxy-3-pyridazinyl)benzenesulfonamide, 4-[(1-phthal-azinylsulfanyl)methyl]benzoic acid, 4-methylbenzaldehyde (4-chloro-1-phthalazinyl)hydrazone, 1-phenylethanone (4-chloro-1-phthalazinyl) hydrazone, 2-methylbenzaldehyde (4-chloro-1-phthalazinyl)hydrazone, (1R,5S)-3-(6-chloro-3-pyridazinyl)-3,8-diazabicyclo[3,2,1]octane dihydrochloride, and 4-methyl-N-[2-(4-morpholinyl)ethyl]-6-phenyl-3-pyridazinamine dihydrochloride.

Examples of suitable thiazole derivatives include, but are not limited to, 5-methyl-1,3-thiazole, 4-methyl-1,3-thiazole, 1,3-thiazol-2-amine, 1,3-thiazole-5-carbaldehyde, 1,3-thiazole-2-carbaldehyde, 4,5-dimethyl-1,3-thiazole, 2,4-dimethyl-1,3-thiazole, 4-methyl-1,3-thiazol-2-amine, and 5-methyl-1,3-thiazol-2-amine.

Examples of suitable benzoxazole derivatives include, but are not limited to, 2-methyl-1,3-benzoxazole, 2-hydrazinobenzoxazole, 6-fluoro-2-methyl-1,3-benzoxazole, 1,3-benzoxazol-2-ylhydrosulfide, 2-chloro-1,3-benzoxazole, 5-chloro-1,3-benzoxazole, 2,5,6-trimethylbenzoxazole, 5-methyoxy-2-methylbenzoxazole, 2-(methylthio)benzoxazole, 5-chloro-2-methyl-1,3-benzoxazole, 5-chloro-1,3-benzoxazol-2-amine, 1-(2-benzoxazolyl)-guanidine, 2-methyl-6-nitrobenzoxazole, 5-chloro-2,6-dimethylbenzoxazole, 2-methylnaphth (2,1-D)oxazole, 5-acetamido-2-methylbenzoxazole, 2-phenyl-1,3-benzoxazole, 5-phenyl-benzooxazole, 2-methyl-5-phenyl-1,3-benzoxazole, 2-phenyl-1,3-benzoxazol-5-amine, 4-(1,3-benzoxazol-2-yl)aniline, 2-(1,3-benzoxazol-2-yl)phenol, 5-cyciohexyl-2-methylbenzoxazole, 2-(2-methylphenyl)-1,3-benzoxazol-5-amine, 5-(1,3-benzoxazol-2-yl)-2-methylaniline, 3-(6-methyl-1,3-benzoxazol-2-yl)phenylamine, 3-(5-methyl-1,3-benzoxazol-2-yl)phenylamine, 4-(5-methyl-1,3-benzoxazol-2-yl)phenylamine, 2-(5-methyl-1,3-benzoxazol-2-yl)phenol, N-benzooxazol-2-yl-N'-furan-2-ylmethylenehydrazine, 3-(5,6-dimethyl-1,3-benzoxazol-2-yl)aniline, 2-methyl-5-(6-methyl-1,3-benzoxazol-2-yl)aniline, 2-(4-ethylphenyl)-1,3-benzoxazol-5-amine, 2-methyl-5-(5-methyl-1,3-benzoxazol-2-yl)aniline, 2-(3-nitrophenyl)-1,3-benzoxazole, 3-(1,3-benzoxazol-2-yl)-4-chloroaniline, 2-(4-chlorophenyl)-1,3-benzoxazol-5-amine, 2-(2-chlorophenyl)-1,3-benzoxazol-5-amine, 2-(3-chlorophenyl)-1,3-benzoxazol-5-amine, 3-(5-chloro-1,3-benzoxazol-2-yl)phenylamine, 4-(5-chloro-1,3-benzoxazol-2-yl)phenylamine, 4-benzooxazol-2-yl-quinoline, methyl naphtho(1,2-D)(1,3)oxazol-2-yl sulfone, 2-(benzooxazol-2-yl-hydrazonomethyl)-phenol, 4-(benzooxazol-2-yl-hydrazonomethyl)-phenol, 4-chloro-3-(5-methyl-1,3-benzoxazol-2-yl)aniline, 4-chloro-3-(6-methyl-1,3-benzoxazol-2-yl)aniline, 4-benzooxazol-2-yl-2-methyl-quinoline, 2-(1-naphthyl)-1,3-benzoxazol-5-amine, 4-amino-2-(5-chloro-1,3-benzoxazol-2-yl)phenol, 5-amino-2-(5-chloro-1,3-benzoxazol-2-yl)phenol, 1,3-benzoxazol-2-ylphenoxyacetate, 2-chloro-3-ethyl-1,3-benzoxazol-3-ium tetrafluoroborate, ethyl 2-cyano-3-((2-methyl-1,3-benzoxazol-5-yl)amino)acrylate, 2-(4-methyoxy-benzylsulfanyl)-benzooxazole, 2-(((5-nitro-2-furyl)methyl)thio)-1,3-benzoxazole, 4-chloro-3-(5-chloro-1,3-benzoxazol-2-yl)aniline, 2-(2,4-dichlorophenyl)-1,3-benzoxazol-5-amine, 2-(2,5-dichlorophenyl)-1,3-benzoxazol-5-amine, 2-(3,4-dichlorophenyl)-1,3-benzoxazol-5-amine, 3-(1,3-benzoxazol-2-yl)-7-hydroxy-2H-chromen-2-one, N-[3-(1,3-benzoxazol-2-yl)phenyl]-2-methylpropanamide, 4-(dimethylamino)benzaldehyde 1,3-benzoxazol-2-ylhydrazone, N-benzooxazol-2-yl-N'-(4-nitro-benzylidene)-hydrazine, 3-hydroxy-4-methoxybenzaldehyde 1,3-benzoxazol-2-ylhydrazone, N-(benzooxazol-2-ylsulfanylmethyl)-benzamide, 4-methyoxy-thiobenzoic acid S-benzooxazol-2-yl ester, 2-(4-nitro-benzylsulfanyl)-benzooxazole, 2-(1,1'-biphenyl)-4-yl-1,3-benzoxazol-5-amine, 2-(4-bromophenyl)-1,3-benzoxazol-5-amine, 2-(2-bromophenyl)-1,3-benzoxazol-5-amine, 2-(3-bromophenyl)-1,3-benzoxazol-5-amine, 3-chloro-thiobenzoic acid S-benzooxazol-2-yl ester, 3-(1,3-benzoxazol-2-yl)-N-(4-methylphenyl)-2-oxopropanamide, 2-(1,3-benzoxazol-2-ylthio)-1-(4-hydroxy-2-methylphenyl)ethanone, 2-((1,3-benzoxazol-2-ylthio)methyl)-4-nitrophenol, 3-(1,3-benzoxazol-2-yl)-7-hydroxy-2-oxo-2H-chromene-4-carbonitrile, diethyl 2-(2-benzoxazolyl)-2-ethylmalonate, 2-(3,5-dichloro-4-methoxyphenyl)-1,3-benzoxazol-5-amine, 2-(1,3-benzoxazol-2-yl)phenyl benzoate, N-benzooxazol-2-yl-N'-(4-bromo-benzylidene)-hydrazine, 2-(2,4-dinitrophenylthio)benzoxazole, toluene-4-sulfonic acid 1-benzooxazol-2-yl-ethyl ester, 2-(3-bromo-4-methoxyphenyl)-1,3-benzoxazol-5-ylamine, 3-(1,3-benzoxazol-2-yl)-2-oxo-2H-chromen-7-yl acetate, 2-(5-bromo-2-chlorophenyl)-1,3-benzoxazol-5-ylamine, 4-(5-(1,3-benzoxazol-2-yl)-1H-benzimidazol-2-yl)phenylamine, N-(4-acetyl-phenyl)-2-(benzooxazol-2-ylsulfanyl)-acetamide, 4-(2-(benzooxazol-2-ylsulfanyl)-acetylamino)-benzoic acid, 3-(1,3-benzoxazol-2-yl)-N-(3-chloro-2-methylphenyl)-2-oxopropanamide, 4-(5-chloro-2-(2-chlorophenyl)-1,3-benzoxazol-7-yl)-3-butyn-2-ol, 2-(3-phenoxy-benzylsulfanyl)-benzooxazole, and 2-{4-[(6-chloro-1,3-benzoxazol-2-yl)oxy]phenoxy}propanoic acid.

Examples of suitable 1,3,5-triazine derivatives include, but are not limited to, 1,3,5-triazine-d3, 2-amino-1,3,5-triazine, 2,4-diamino-1,3,5-triazine, 1,3,5-triazine-2,4-diamine, 6-methyl-1,3,5-triazine-2,4-diamine, 1,3,5-triazine-2,4,6-triamine, 4,6-diamino-1,3,5-triazin-2-ol, 1,3,5-triaz-inane-2,4,6-trione, 2,4,6-trifluoro-1,3,5-triazine, 4-amino-2-dimethylamino-1,3,5-triazine, 4-methoxy-6-methyl-1,3,5-triazin-2-amine, 6-chloro-1,3,5-triazine-2,4-diamine, 1,3,5-triazine-2,4,6-triamine hydrofluoride, N-(4-methoxy-6-methyl-1,3,5-triazin-2-yl)-N-methylamine, 4-chloro-N-ethyl-6-(hydroxyamino)-1,3,5-triazin-2-amine, 1,3,5-triazine-2,4,6-triol compound with hydrazine (1:1), N(2)-cyclopropyl-1,3,5-triazine-2,4,6-triamine, N(2)-ethyl-6-methoxy-1,3,5-triazine-2,4-diamine, 4-chloro-6-(hydroxyamino)-N-isopropyl-1,3,5-triazin-2-amine, 6-ethoxy-N(2)-methyl-1,3,5-triazine-2,4-diamine, 2,4,6-trimethoxy-1,3,5-triazine, 2-chloro-N-(1,3,5)triazin-2-yl-acetamide, 6-chloro-N(2)-ethyl-1,3,5-triazine-2,4-diamine, 2-chloro-4,6-dimethoxy-1,3,5-triazine, 1,3,5-triazine-2,4,6-trithiol, 4,6-dichloro-1,3,5-triazine, 4,6-dichloro-1,3,5-triazin-2-yll methyl ether, 2,4-diamino-6-isobutyryl-1,3,5-triazine, 2,4,6-trichloro-1,3,5-triazine, 6-phenyl-1,3,5-triazine-2,4-diamine, 2,4,6-trichloro-1,3,5-triazine, 6-chloro-N(2)-isopropyl-1,3,5-triazine-2,4-diamine, 4,6-diamino-gamma-oxo-1,3,5-triazine-2-butyronitrile, N-methyl-6-trifluoromethyl-(1,3,5)triazine-2,4-diamine, 2-amino-6-cyclohexylamino-1,3,5-triazine, potassium 4,6-dioxo-1,4,5,6-tetrahydro-1,3,5-triazine-2-carboxylate, N(2)-(tert-butyl)-6-methoxy-1,3,5-triazine-2,4-diamine, 2,4-diamino-6-(m-tolyl)-1,3,5-triazine, N(2)-(2-methylphenyl)-1,3,5-triazine-2,4-diamine, N(2)-(4-methylphenyl)-1,3,5-triazine-2,4-diamine, N(2)-(sec-butyl)-6-chloro-1,3,5-triazine-2,4-diamine, 6-chloro-N(2),N(4)-diethyl-1,3,5-triazine-2,4-diamine, 6-chloro-N(2),N(4)-diethyl-1,3,5-triazine-2,4-diamine, N(2)-(tert-butyl)-6-chloro-1,3,5-triazine-2,4-diamine, 6-(3-fluorophenyl)-1,3,5-triazine-2,4-diamine, 6-(4-fluorophenyl)-1,3,5-triazine-2,4-diamine, 6-(2-fluorophenyl)-1,3,5-triazine-2,4-diamine, N(2),N(2),N(4),N(4),N(6),N(6)-hexamethyl-1,3,5-triazine-2,4,6-triamine, 4,6-bis(isopropylamino)-1,3,5-triazin-2-ol, 4-(tert-butylamino)-6-(ethylamino)-1,3,5-triazin-2-ol, N(2)-ethyl-N(4)-isopropyl-6-methoxy-1,3,5-triazine-2,4-diamine, 6-chloro-N(2),N(4)-diethyl-1,3,5-triazine-2,4-diamine-d10, N(2),N(4)-diethyl-6-(methyl-sulfanyl)-1,3,5-triazine-2,4-diamine, 2,4-diamino-6-(2,3-xylyl)-1,3,5-triazine, 6-chloro-N(2)-ethyl-N(4)-isopropyl-1,3,5-triazine-2,4-diamine, 6-chloro-N(2)-ethyl-N(4)-isopropyl-1,3,5-triazine-2,4-diamine, 6-chloro-N(2)-ethyl-N(4)-isopropyl-1,3,5-triazine-2,4-diamine, N(2)-(2-methyoxy-phenyl)-1,3,5-triazine-2,4-diamine, 6-(4-methoxyphenyl)-1,3,5-triazine-2,4-diamine, 2-chloro-4-ethyl-d5-amino-6-isopropylamino-1,3,5-triazine, 4,6-dichloro-N,N-diethyl-1,3,5-triazin-2-amine, 2-amino-4-(4-chloroanilino)-1,3,5-triazine, 2-(2-chlorophenyl)-4,6-diamino-1,3,5-triazine, 6-(4-chloro-phenyl)-1,3,5-triazine-2,4-diamine, 2-N-butoxy-4,6-dichloro-1,3,5-triazine, 6-(3,5-difluorophenyl)-1,3,5-triazine-2,4-diamine, 2-amino-4-phenylamino-1,3,5-triazine hydrochloride, 1-[4-amino-6-(methylsulfanyl)-1,3,5-triazin-2-yl]-3-isopropyl-1,2-triazadien-2-ium, N(2),N(4)-diisopropyl-6-methoxy-1,3,5-triazine-2,4-diamine, N(2)-(sec-butyl)-N(4)-ethyl-6-methoxy-1,3,5-triazine-2,4-diamine, N(2)-(tert-butyl)-N(4)-ethyl-6-methoxy-1,3,5-triazine-2,4-diamine, N(2)-methyl-6-(2-phenylvinyl)-1,3,5-triazine-2,4-diamine, 6-(ethylthio)-N(2)-isopropyl-N(4)-methyl-1,3,5-triazine-2,4-diamine, N(2)-ethyl-N(4)-isopropyl-6-(methylsulfanyl)-1,3,5-triazine-2,4-diamine, 6-chloro-N(2)-cyclopropyl-N(4)-isopropyl-1,3,5-triazine-2,4-diamine, 2,4-diamino-6-phenylacetyl-1,3,5-triazine, N(2),N(4),N(6)-trichloro-1,3,5-triazine-2,4,6-triamine, 6-chloro-N,N'-dipropyl-(1,3,5)triazine-2,4- diamine, N(2)-(sec-butyl)-6-chloro-N(4)-ethyl-1,3,5-triazine-2,4-diamine, 6-chloro-N(2),N(4)-diisopropyl-1,3,5-triazine-2,4-diamine, 6-chloro-N(2),N(2),N(4)-triethyl-1,3,5-triazine-2,4-diamine, 4-(1,2,4)triazol-4-yl-6-trifluoromethyl-(1,3,5)triazin-2-ylamine, 2,4-diamino-6-(3-nitrophenyl)-1,3,5-triazine, 2-amino-4-anilino-6-(chloromethyl)-1,3,5-triazine, 4-chloro-2-(4,6-diamino-1,3,5-triazin-2-yl)phenol, 5,7-bis(ethylamino)(1,2,4)triazolo(4,3-A)(1,3,5)triazine-3-thiol, 2-{[4-chloro-6-(ethylamino)-1,3,5-triazin-2-yl]amino}-2-methylpropanenitrile, N(2),N(4)-diisopropyl-6-(methylsulfanyl)-1,3,5-triazine-2,4-diamine, N(2)-(tert-butyl)-N(4)-ethyl-6-(methylsulfanyl)-1,3,5-triazine-2,4-diamine, 4,6-dichloro-1,3,5-triazin-2-yl phenyl ether, 1,3,5-Triazine-2,4,6-trithiol trisodium salt, N(2)-(sec-butyl)-6-chloro-N(4)-isopropyl-1,3,5-triazine-2,4-diamine, 2,4,6-tris(allyloxy)-1,3,5-triazine, and N(4-amino-S-triazin-2-yl)-sulfanilic acid.

Examples of suitable 2,2'-bipyridine derivatives include, but are not limited to, 2,2'-bipyridine, 6-methyl-2,2'-bipyridine, 2-(2-pyridinyl)pyridine 1-oxide, 4,4'-dimethyl-2,2'-bipyridine, 5,5'-dimethyl-2,2'-bipyridine, 6,6'-dimethyl-2,2'-bipyridine, 2,2'-bipyridine-3,3'-diol, 2,2'-bipyridineN,N'-dioxide, and 2-(2-pyridinyl)quinoline.

1H-Benzotriazole, non-2H-substituted benzotriazole derivatives, imidazole, and imidazole derivatives are preferred unsaturated heterocyclic compounds. Specific examples of preferred unsaturated heterocyclic compounds include, without limitation, 1H-benzotriazole; 5-methyl-1H-benzotriazole; imidazole; 2-methyl imidazole; and 1H-1,2,3-triazole. 1H-Benzotriazole is a more preferred unsaturated heterocyclic compound.

Moreover, the PVB composition may further comprise one or more UV absorbers at a level ranging from about 0.01 wt %, or about 0.05 wt %, or about 0.08 wt % to about 1 wt %, or about 0.8 wt %, or about 0.5 wt %, based on the total weight of the PVB composition. UV absorbers are well-known in the art, and any known UV absorber may find utility within the PVB composition. Examples of suitable UV absorbers include, but are not limited to, benzotriazole derivatives, hydroxybenzophenones, hydroxyphenyl triazines, esters of substituted and unsubstituted benzoic acids, and mixtures of any two or more of these suitable UV absorbers. Significantly, the benzotriazole derivatives that are useful as UV absorbers are 2-H substituted benzotriazole derivatives. Therefore, they are not included in the definitions of non-2-H substituted benzotriazole derivatives and of unsaturated heterocyclic compounds that are set forth above. Suitable commercially available UV absorbers include, but are not limited to, Tinuvin™ P, Tinuvin™ 1130, Tinuvin™ 326, Tinuvin™ 327, Tinuvin™ 328, Tinuvin™ 571, Tinuvin™ 99-DW, or Chimassob™ 81, manufactured by Ciba, Uvinul™ 3000, Uvinul™ 3008, Uvinul™ 3040, or Uvinul™ 3050, manufactured by BASF (Germany), and Cyasorb™ 5411, manufactured by Cytec Industries, Inc.

The PVB composition may further comprise one or more thermal stabilizers at a level ranging from about 0.01 wt %, or about 0.05 wt %, or about 0.08 wt % to about 1 wt %, or about 0.8 wt %, or about 0.5 wt %, based on the total weight of the PVB composition. The thermal stabilizers used here may also be referred to as phenolic antioxidants and are well known in the industry. Examples of suitable thermal stabilizers include, but are not limited to, Irganox™ 1010, Irganox™ 1035, Irganox™ M 1076, Irganox™ 1081, Irganox™ 1098, Irganox™ 1135, Irganox™ 1330, Irganox™ 1425 WL, Irganox™ 1520, Irganox™ 245, Irganox™ 3114, Irganox™ 565, Irganox™ E 201, or Irganox™ MD 1024 manufactured by Ciba, Lowinox™ 1790, Lowinox™ 22M46, Lowinox™ 44B25, Lowinox™ CA22, Lowinox™ CPL, Lowinox™ HD 98, Lowinox™ MD24, Lowinox™ TBM-6, or Lowinox™ WSP, manufactured by Chemtura (Middlebury, Conn.), Cyanox™ 1741, Cyanox™ 2246, or Cyanox™ 425, manufactured by Cytec, or mixtures of any thereof. Thermal stabilizers of note include Lowinox™ 1790, Lowinox™ 22M46, Lowinox™ 44B25, Lowinox™ CA22, Lowinox™ CPL, Lowinox™ HD 98, Lowinox™ MD24, Lowinox™ TBM-6, or Lowinox™ WSP, or mixtures of any thereof. One preferred thermal stabilizer is octylphenol. Another preferred thermal stabilizer is butylated hydoxytoluene (BHT).

The PVB composition may further comprise one or more hindered amines at a level of up to 1 wt %. Alternatively, the hindered amines may be present at a level ranging from about 0.08 wt %, or about 0.1 wt %, or greater than 0.1 wt %, to about 1 wt %, to about 0.8 wt %, or up to about 0.5 wt %, based on the total weight of the PVB composition. The hindered amines may be secondary or tertiary hindered amines. Examples of suitable secondary hindered amines include, but are not limited to, 2,2,6,6-Tetramethyl-piperadine, 2,2,6,6-Tetramethylpiperadinol, and mixtures thereof. Examples of suitable tertiary hindered amines include, but are not limited to, N-butyl piperidine, N,N-diethyl cyclohexylamine, and mixtures of any two or more thereof. In some preferred PVB compositions, the hindered amines are hindered amine light stabilizers (HALS), which are typically secondary, tertiary, acetylated, N hydrocarbyloxy substituted, hydroxy substituted N-hydrocarbyloxy substituted, or other substituted cyclic amines which further incorporate steric hindrance, generally derived from aliphatic substitution on the carbon atoms adjacent to the amine function. As used herein, the terms "hindered amines" and "hindered amine light stabilizers" refer to compounds that are completely saturated, except for substituents that include a carbonyl group. Therefore, these terms do not refer to any of the unsaturated heterocyclic compounds described above. Hindered amine light stabilizers are also well known within the art and commercially available. For example, Tinuvin™ 111, Tinuvin™ 123, Tinuvin™ 144, Tinuvin™ 152, Tinuvin™ 292, Tinuvin™ 622, Tinuvin™ 765, Tinuvin™ 770, Tinuvin™ 783,Tinuvin™ 791, Chimassorb™ 119, Chimassorb™ 2020, or Chimassorb™ 944, manufactured by Ciba (Tarrytown, N.Y.), Cyasorb™ 3346 or Cyasorb™ 3853S manufactured by (Cytec Industries, Inc., Paterson, N.J.), or a combination of any two or more thereof can be used in the PVB composition. Further information regarding suitable hindered amines and their use in encapsulant compositions may be found in U.S. Provisional Appln. No. 61/146,522, filed on Jan. 22, 2009.

The PVB composition may further comprise one or more chelating agents at a level ranging from about 0.01 wt %, or about 0.05 wt %, or about 0.08 wt % to about 1 wt %, or about 0.8 wt %, or about 0.5 wt %, based on the total weight of the PVB composition. Examples of suitable chelating agents include, but are not limited to, ethylenediaminetetraacetic acid (EDTA), ethylenediamine monoacetic acid, ethylenediamine diacetic acid, ethylenediamine triacetic acid, ethylene diamine, tris(2-aminoethyl) amine, diethylenetriaminepentacetic acid, or mixtures of any thereof. As used herein, the term "chelating agent" does not include 2,2'-bipyridine or its derivatives. Further information regarding suitable chelating agents and their use in encapsulant compositions may be found in U.S. Provisional Appln. No. 61/146,547, filed on Jan. 22, 2009.

In addition to the plasticizer and the additives listed above, the PVB composition may further comprise one or more of any other suitable additives, including, but not limited to, adhesion control additives, surface tension controlling agents, processing aids, flow enhancing additives, lubricants, pigments, dyes, flame retardants, impact modifiers, nucleating agents, anti-blocking agents such as silica, dispersants, surfactants, coupling agents, reinforcement additives, such as glass fiber, fillers and the like. These additives, suitable concentrations of the additives, and methods for incorporating them into the PVB compositions are described in the *Kirk Othmer Encyclopedia of Chemical Technology*, $5^{th}$ Edition, John Wiley & Sons (New Jersey, 2004), for example.

Further provided herein is a solar cell module that comprises a solar cell assembly, wherein (A) the solar cell assembly comprises at least one solar cell and a silver component; (B) the solar cell assembly is fully or partially encapsulated by a PVB encapsulant layer or layers comprising the PVB composition described above; and (C) the silver component is at least partially in contact with the PVB encapsulant layer or layers.

The term "solar cell" as used herein includes any article that converts light into electrical energy. Solar cells useful in the solar cell assemblies and modules described herein include, but are not limited to, wafer-based solar cells (e.g., c-Si or mc-Si based solar cells), thin film solar cells (e.g., a-Si, pc-Si, CdTe, or CI(G)S based solar cells), and organic solar cells. In principle, however, any type of solar cell known in the art is suitable for use in the solar cell modules described herein. The solar cells may include, but are not limited to, those described in U.S. Pat. Nos. 4,017,332; 4,179,702; 4,292,416; 6,123,824; 6,288,325; 6,613,603; and 6,784,361, U.S. Patent Publication Nos. 2006/0213548; 2008/0185033; 2008/0223436; 2008/0251120; and 2008/0271675; and PCT Patent Application Nos. W02004/084282 and 2007/103598.

By "fully encapsulated", it is meant that the solar cell assembly is laminated or sandwiched between two encapsulant layers comprising the PVB composition. Generally, the area of the largest surface of the solar cell assembly is smaller than that of some other components of the solar cell module, such as, for example, the substrate or superstrate, or the front or back protecting layers, or the encapsulant layer(s) before or after lamination. Therefore, in modules comprising fully encapsulated assemblies, the two PVB encapsulant layers may come in contact with each other over the edges of the solar cell assembly and form a seal around the edges of the solar cell module. When the area of the largest surface of the encapsulant layers is larger than that of the solar cell assembly, the contact between them may be established in the stacked, unlaminated solar cell module. Alternatively, when the greatest two-dimensional surface area of the encapsulant layers is smaller than that of the solar cell assembly, the contact between them may not be established until the encapsulant layers melt and flow under the heat and pressure of the solar cell module lamination process. Those of skill in the art will be able to take account of the changes necessitated in the above description by solar cell assemblies having a significant thickness.

By "partially encapsulated", it is meant that the solar cell assembly, which comprises solar cells (such as thin film solar cells) and is deposited on a substrate (or superstrate), has one side that is opposite from the substrate (or superstrate) laminated to an encapsulant layer comprising the PVB composition so that the solar cell assembly is sandwiched between the substrate (or superstrate) and the PVB encapsulant layer. In modules comprising partially encapsulated assemblies, the PVB encapsulant layer may come in contact with the substrate (or superstrate) of the solar cell assembly over the edges of the solar cell module and form a seal around the edges of the solar cell assembly. Again, depending on the relative surface areas of the substrate (superstrate), the solar cell assembly and the encapsulant layer, the edge seal may form before or after the lamination process that forms the solar cell module.

In one solar cell module, for example, the PVB encapsulant layer(s) are formed from PVB sheets and the encapsulated solar cell assembly is formed by laminating one or both sides of the solar cell assemblies to the PVB sheet(s). The PVB sheets may have a thickness of about 0.25 to about 1.2 mm.

It has been found that, within a solar cell module, when a prior art PVB encapsulant is in complete or partial contact with a silver component (such as a component comprising silver or silver alloy), the prior art PVB encapsulant tends to discolor or yellow over time.

Without wishing to be bound by theory, it is believed that such discoloration results when $Ag^°$ comprised in the silver component is oxidized, under high voltage and high moisture conditions, to form $Ag^+$ ions that migrate into the PVB encapsulant. Once in the PVB encapsulant, the $Ag^+$ ions are then reduced to metallic silver($Ag^°$). The metallic silver, which may be in the form of nano-sized silver particles, is believed to cause the discoloration. By adding the unsaturated heterocyclic compounds and optionally the other additives described above into the PVB encapsulants, however, the formation of the elemental silver is prevented, and the resulting discoloration of the PVB encapsulant is mitigated.

More specifically, when the PVB encapsulant described herein is in prolonged contact with one or more silver components, the yellowness index (YI) change of the PVB encapsulant is reduced or minimized. The YI for a PVB encapsulant can be determined in accordance with ASTM E313-05, using a 2° observer and using Illuminant C as a light source. These conditions may also be described as "2°/C". The YI is reported in unitless numbers and must be normalized to a particular sample pathlength for direct comparison. In general, the YI of PVB encapsulants described herein remains about 60 or less, or about 55 or less, or about 50 or less, or 40 or less, or about 30 or less, or about 20 or less, for a sample having a pathlength of 1.0 cm.

The YI of the PVB encapsulant in a solar cell module is difficult to measure in situ, as the yellowness of the other components in the module, such as the coatings, is difficult to deconvolute from that of the encapsulant. In order to avoid this obstacle, it is generally necessary to delaminate the module, isolating the PVB encapsulant. Delamination is also an inconvenient procedure, however. Therefore, the YI of the PVB encapsulant is generally measured using a model system. Both solid encapsulants and polymer solutions may be used as model systems for the YI of PVB encapsulants in solar cell modules.

When a solid encapsulant is used as a model, it is laminated to the silvered side of silver-coated glass sheet, then held under a bias of 1,000 V for 1000 hours at 85° C. and at 85% relative humidity (RH). The solid encapsulants used as models herein have a constant plasticizer concentration, for the validity of the comparison of the encapsulants' YI. The total amount of the other additives (unsaturated heterocyclic compound, UV absorber, thermal stabilizer, hindered amine and the like) is typically about 1% or less of the amount of plasticizer in the solid encapsulants; accordingly, changes in YI due to variation in the amounts of the additives is deemed to be insignificant.

When a polymer solution is used as a model system, a stock solution of neat PVB resin (10 g) in methanol (100 g) is combined with a stock solution of a silver salt in methanol and with stock solutions of any additives that are included in the solution model. The solution samples are incubated at 60° C. in a hot water bath for 2 to 8 hours, until the yellow color of a negative control sample becomes apparent to the naked eye. The samples are transferred to cuvettes having a pathlength of 1.0 cm, and their spectra are obtained according to the standard method. The concentrations of the PVB and of the silver (calculated as silver ions) in the solution samples are held constant, again for validity of comparison of the solutions' YI.

The term "silver component", as used herein, refers to a constituent part or to any sub-combination of the constituent parts of the solar cell assembly or of the solar cell module that comprises elemental silver. The terms "elemental silver", "metallic silver", and "Ag°" are synonymous and are used interchangeably herein. The elemental silver may be present in substantially neat or pure form, for example as it is used in a reflector film. Alternatively, it may be compounded, for example with a non-metallic material such as a carrier or a filler, or it may be present in a solid solution, in an alloy, in crystalline form, as a powder or as a flake, as the continuous or dispersed phase of a dispersion, or in any other morphology. For example, the solder material used in some connecting wires is a silver and aluminum alloy containing as little as about 2 wt % of silver.

The silver component may be any one or more of the conductive paste, the connecting wires, the metal conductive coatings, and the metal reflector films.

The conductive paste, which is typically used in wafer-based solar cells, is a conductive film deposited on the front sun-facing or back non-sun-facing side of solar cells to efficiently contact the solar cells and transport the photo-generated current. The front conductive paste, for example, may comprise elemental silver.

The term "connecting wires" as used herein also includes the solder materials used to connect the individual wires together or to anchor the wires onto the solar cells. The connecting wires, which may be included in both wafer-based solar cells and thin film solar cells, are typically soldered on the surface of the solar cells to provide electrical connections between individual solar cells and to lead the photo-generated current out of the modules. In certain solar cell modules, the connecting wires (including its solder material), and especially the solder material, may comprise silver or a silver alloy.

During the construction of thin film solar cells, a first conductive layer (e.g., a transparent conductive oxide (TCO) or metal coating) is first coated on the substrate before the photon absorbing materials is deposited thereon. Further, during the construction of the solar cells, a second conductive layer (e.g., a TCO or metal coating) is further deposited on the photon absorbing materials. The silver component may be one or both of these two metal conductive coatings.

Metal back reflector films are often incorporated in thin film solar cells to reflect the photons that have passed around or through the solar cells back onto the solar cells, thereby improving power generating efficiency. In certain solar cell modules, the metal back reflector film is formed by sputtering a silver layer or a silver comprising layer on the solar cells.

Moreover, the silver component may be completely or partially in contact with the PVB encapsulant. For example, "partially in contact with" indicates that the silver at least about $3.6 \times 10^{-5}$% of the silver component's surface area is in contact with the PVB encapsulant. This amount corresponds to the calculated area of scribe lines in a thin film cell, although it is also used herein to indicate a minimum surface area of contact for other silver components and in different types of solar cell modules. In contrast, the silver component is completely in contact with PVB, for example in a solar cell module in which substantially 100% of the surface area of a reflector film is in contact with the PVB encapsulant. When used without modification, however, as in the term "the silver component is in contact with the PVB encapsulant," for example, any non-zero level of contact is indicated. Stated alternatively, any non-zero percentage of the component's surface area may be in contact with the PVB encapsulant.

In one module, the solar cells are wafer-based solar cells, and the silver component may be a conductive paste deposited thereon, or it may be one or more connecting wires. The silver component is in contact with the PVB encapsulant. Further, the solar cell assembly, which comprises the wafer-based solar cells and the silver component, and which is encapsulated by the PVB encapsulant, may be further sandwiched between two protective outer layers (which are also referred to as the front and back sheets).

The protective outer layers of the solar cell modules may be formed of any suitable sheets or films. Suitable sheets include glass sheets, metal sheets such as aluminum, steel, galvanized steel, ceramic plates, or plastic sheets, such as polycarbonates, acrylics, polyacrylates, cyclic polyolefins (e.g., ethylene norbornene polymers), polystyrenes (preferably polystyrenes prepared in the presence of metallocene catalysts), polyamides, polyesters, fluoropolymers, or combinations of two or more thereof.

Suitable films include metal films, such as aluminum foil, or polymeric films such as those comprising polyesters (e.g., poly(ethylene terephthalate) and poly(ethylene naphthalate)), polycarbonate, polyolefins (e.g., polypropylene, polyethylene, and cyclic polyolefins), norbornene polymers, polystyrene (e.g., syndiotactic polystyrene), styrene-acrylate copolymers, acrylonitrile-styrene copolymers, polysulfones (e.g., polyethersulfone, polysulfone, etc.), nylons, poly(urethanes), acrylics, cellulose acetates (e.g., cellulose acetate, cellulose triacetates, etc.), cellophane, silicones, poly(vinyl chlorides) (e.g., poly(vinylidene chloride)), fluoropolymers (e.g., polyvinyl fluoride, polyvinylidene fluoride, polytetrafluoroethylene, ethylene-tetrafluoroethylene copolymers, etc.), or combinations of two or more thereof. The polymeric film may be non-oriented, or uniaxially oriented, or biaxially oriented. Some specific examples of suitable polymeric films include, but are not limited to, polyester films (e.g., poly (ethylene terephthalate) films), fluoropolymer films (e.g., Tedlar®, Tefzel®, and Teflon® films available from E. I. du Pont de Nemours and Company (DuPont), Wilmington, Del.). Further, the films may be in the form of a multi-layer film, such as a fluoropolymer/polyester/fluoropolymer multilayer film (e.g., Tedlar®/PET/Tedlar® or TPT laminate film available from Isovolta A G., Austria or Madico, Woburn, Mass.).

In another module, the solar cells are thin film solar cells, and the silver component may be selected from connecting wires, conductive coatings, or back reflector films, or a combination of two or more thereof. In one particular thin film solar cell, the silver component is a conductive coating comprising silver or silver alloy. The silver component may also be a back reflector film comprising silver or silver alloy. Similarly to the above described wafer-based solar cell modules, the thin film solar cell assembly is fully or partially encapsulated by the PVB encapsulant, and the silver component is in contact with the PVB encapsulant. Again, the fully or partially encapsulated thin film solar cell assembly may be further sandwiched between two additional protective outer layers, such as a front or back sheet. Alternatively, the thin film solar cell assembly may be partially encapsulated by the PVB encapsulant, i.e., in which the side that is opposite from the substrate (or superstrate) is laminated to the PVB encapsulant, and in which the PVB encapsulant is further laminated to a protective outer layer. Also preferably, the thin film solar cell assembly comprises a reflector film which, in turn, comprises silver and which is in contact with the PVB encapsulant.

In a preferred thin film solar cell module, the light absorbing materials are deposited on a substrate in layers. The substrate may be made of glass, or any suitable metal, or polymeric sheets or films as described above for the protective outer layers. The thin film solar cells may be single-junction or multi-junction (including tandem junction) thin film solar cells. As the spectrum of solar radiation provides photons of varying energies, multi-junction solar cells were developed in which the sunlight passes serially through several solar cell layers. Each separate layer of the multi-junction solar cell is tailored to convert photons of a specific wavelength efficiently to electrical energy. The multi-junction solar cells are usually constructed with layers of different energy gaps. The layers having greater energy gaps are adjacent to the surface through which the light enters the module. The layers having lesser energy gaps are positioned further towards the interior or back of the module.

Further provided is a solar cell array comprising two or more of the solar cell modules described above.

Further provided is a process for converting light energy to electricity, said process comprising the step of exposing a solar cell assembly or a solar cell module to electromagnetic radiation Further provided is a process for converting solar energy to electricity, said process comprising the step of exposing a solar cell assembly or a solar cell module to solar radiation.

Any suitable process may be used in preparing the solar cell modules described herein. In particular, any suitable lamination process known within the art (such as an autoclave or a non-autoclave process) may be used to prepare the solar cell modules. For example, in a typical lamination process, the solar cells are first stacked between the PVB encapsulants (e.g., in the form of PVB sheets), and further between two protective films or sheets, and this pre-lamination assembly is then subjected to the lamination process. Further, in the preparation of thin film solar cell modules, the solar cells, which are deposited over a substrate, are first stacked over the PVB encapsulant (e.g., in the form of a PVB sheet) and then a protective film or sheet, to form a pre-lamination assembly.

Accordingly, further provided herein is a pre-lamination assembly for preparing a solar cell module. The pre-lamination assembly comprises a solar cell assembly, which in turn comprises a solar cell, an oxidizable metal component, and a poly(vinyl butyral) sheet comprising the PVB composition described herein. Preferably, the poly(vinyl butyral) sheet has a thickness of about 0.25 mm to about 1.2 mm and a yellowness index of about 60 or less in accordance with ASTM E313-05 after 1000 hours at 85% relative humidity (RH) and at 85° C. with a bias of 1,000 V. The pre-lamination assembly may further comprise one or more additional layers selected from the group consisting of: a second poly(vinyl butyral) sheet that may be the same as or different from the poly(vinyl butyral) sheet, said second poly(vinyl butyral) sheet being in contact with the solar cell assembly; a protective outer layer that is in contact with the poly(vinyl butyral) sheet; a second protective outer layer that may be the same as or different from the protective outer layer, said second protective outer layer in contact with the second poly(vinyl butyral) sheet; and a substrate or a superstrate that is in contact with the solar cell assembly and with the poly(vinyl butyral) sheet.

In one suitable process, the pre-lamination assembly is placed into a bag capable of sustaining a vacuum ("a vacuum bag"), the air is drawn out of the bag by a vacuum line or other means, the bag is sealed while the vacuum is maintained (e.g., at least about 27-28 in Hg (689-711 mm Hg)), and the sealed bag is placed in an autoclave at a pressure of about 150 to about 250 psi (about 11.3 to about 18.8 bar), a temperature of about 130° C. to about 180° C., or about 120° C. to about 160° C., or about 135° C. to about 160° C., or about 145° C. to about 155° C., for about 10 to about 50 min, or about 20 to about 45 min, or about 20 to about 40 min, or about 25 to about 35 min. A vacuum ring may be substituted for the vacuum bag. One type of suitable vacuum bag is described in U.S. Pat. No. 3,311,517. Following the heat and pressure cycle, the air in the autoclave is cooled without adding additional gas to maintain pressure in the autoclave. After about 20 min of cooling, the excess air pressure is vented and the laminates are removed from the autoclave.

Alternatively, the pre-lamination assembly may be heated in an oven at about 80° C. to about 120° C., or about 90° C. to about 100° C., for about 20 to about 40 min, and thereafter, the heated assembly is passed through a set of nip rolls so that the air in the void spaces between the individual layers may be squeezed out, and the edge of the assembly sealed. The assembly at this stage is referred to as a pre-press.

The pre-press may then be placed in an air autoclave where the temperature is raised to about 120° C. to about 160° C., or about 135° C. to about 160° C., at a pressure of about 100 to about 300 psi (about 6.9 to about 20.7 bar), or preferably about 200 psi (13.8 bar). These conditions are maintained for about 15 to about 60 min, or about 20 to about 50 min, and after which, the air is cooled while no more air is added to the autoclave. After about 20 to about 40 min of cooling, the excess air pressure is vented and the laminated products are removed from the autoclave.

The solar cell modules may also be produced through non-autoclave processes. Suitable non-autoclave processes are described, e.g., in U.S. Pat. Nos. 3,234,062; 3,852,136; 4,341,576; 4,385,951; 4,398,979; 5,536,347; 5,853,516; 6,342,116; and 5,415,909, U.S. Patent Publication No. 20040182493, European Patent No. EP1235683 B1, and PCT Patent Publication Nos. WO9101880 and WO03057478. Generally, the non-autoclave processes include heating the pre-lamination assembly and the application of vacuum, pressure or both. For example, the assembly may be successively passed through heating ovens and nip rolls.

These examples of lamination processes are not intended to be limiting. Essentially any lamination process that is operative may be used.

The Examples below are provided to describe the invention in further detail. These Examples, which set forth a preferred mode presently contemplated for carrying out the invention, are intended to illustrate and not to limit the invention.

EXAMPLES

Control Example CE1

A commercially available Butacite® PVB sheet from DuPont, which comprises 72.97 wt % of poly(vinyl butyral), 26.7 wt % of triethyleneglycol di-2-ethyl-hexanoate, 0.1 wt % of Tinuvin™ P Benzotriazole UV Absorber (Ciba), 0.003 wt % of Tinuvin™ 123 hindered amine light stabilizer (HALS) (Ciba), and 0.22 wt % octylphenol, based on the total weight of the PVB composition, was laminated to a silver coated glass sheet at the silver coated side. After 1000 hours of conditioning at 85% RH, 85° C. and under a bias of 1000 V, the PVB sheet changed color from near water white to dark brown.

In connection with Control Example CE1, Tinuvin™P is a 2-H substituted derivative of benzotriazole. Accordingly, it is not an unsaturated heterocyclic compound as the term is defined herein.

Control Examples CE2 to CE7 and Examples E1 to E5

Solutions of dried neat PVB resin ($6.9 \times 10^{-5}$ mol), silver nitrate ($1.2 \times 10^{-5}$ mol), and additive(s) were prepared by mixing a solution of silver nitrate and additives in methanol with a solution of PVB flake in methanol. The PVB resin had a residual OH level of 18.8 wt %, as determined by ASTM E222-00(2005)e1 (Standard Test Methods for Hydroxyl Groups Using Acetic Anhydride Acetylation, Test B, Reflux Method), and a molecular weight of greater than 125,000 Da, as determined by size exclusion chromatography.

Two control solutions (CE2 and CE3), one with PVB in methanol without additives and one with PVB and silver nitrate in methanol without additives, were also prepared. The solutions were then heated at 60° C. for two to eight hours. Their color change was monitored by measurement with a HunterLab Ultrascan Colorimeter (Hunter Labs, Reston, Va.). Yellowness index (YI) was calculated by ASTM E313-05, using a 2° observer and Illuminant C (2°/C), and normalized to a 1.0 cm pathlength. The results are summarized in Table 1.

E1 to E4 and imidazole in Example E5), the YI was reduced significantly compared to the PVB/silver nitrate/methanol control solutions (Control Examples CE3 to CE7). Addition of optional UV absorbers (e.g., Tinuvin™P, as in Example E2), hindered amines (e.g., Tinuvin™ 770, as in Example E3), or both (as in Example E4) can provide a further reduction of YI.

Control Example CE8 and Example E6

In Example E6, 72.46 wt % of the dried neat PVB resin used in Examples E1 to E5 was blended with a solution of 0.5 wt % 1H-benzotriazole, 0.12 wt % Tinuvin™ P, and 0.22 wt % octylphenol in 26.7 wt % triethylene glycol di-2-ethylhexanoate. This blend was fed into a single screw extruder and melted at a temperature of 200° C., nominally. The resulting melt was pressed into a 30 mil thick sheet, and the sheet was laminated between a first float glass sheet and a second float glass sheet. The second float glass sheet had a silver coating (200 nm thick) on the side that was laminated in contact with the PVB sheet. The laminate of Control Example CE8 had the same structure, except that the PVB sheet was comprised of 72.96 wt % PVB resin, 26.7 wt % triethylene glycol di-2-ethylhexanoate, 0.12 wt % Tinuvin™ P, and 0.22 wt % octylphenol.

The laminates of Control Example CE8 and Example E6 were placed into a chamber held at 85° C. and 85% relative

TABLE 1

| Sample | Unsaturated Heterocyclic Compound | UV Absorber | Other Additives | YI |
|---|---|---|---|---|
| CE2* | — | — | — | 6* |
| CE3 | — | — | — | 290.1 |
| CE4 | — | Tinuvin ® P Benzotriazole UV Absorber** $2.6 \times 10^{-5}$ mol** | — | 139.7 |
| CE5 | — | Tinuvin ® 326 Benzotriazole UV Absorber** $6.1 \times 10^{-6}$ mol | — | 175.8 |
| CE6 | — | — | Octylphenol*** $2.88 \times 10^{-4}$ mol | 197.6 |
| CE7 | — | — | N,N-Diethylcyclohexylamine*** $1.3 \times 10^{-3}$ mol | 151.2 |
| E1 | Benzotriazole*** $1.64 \times 10^{-3}$ mol | — | — | 22.9 |
| E2 | Benzotriazole*** $1.64 \times 10^{-3}$ mol | Tinuvin ® P Benzotriazole UV Absorber** $8.9 \times 10^{-6}$ mol | — | 7.8 |
| E3 | Benzotriazole*** $1.64 \times 10^{-3}$ mol | — | Tinuvin ® 770 Low Molecular Weight Hindered Amine Light Stabilizer (HALS)** $5.7 \times 10^{-6}$ mol | 11.1 |
| E4 | Benzotriazole*** $1.1 \times 10^{-3}$ mol | Tinuvin ® P Benzotriazole UV Absorber** $8.9 \times 10^{-6}$ mol | Tinuvin ® 770 Low Molecular Weight Hindered Amine Light Stabilizer (HALS)** $5.7 \times 10^{-6}$ mol | 10.2 |
| E5 | Imidazole*** $8.6 \times 10^{-4}$ mol | — | — | 9.6 |

Notes:
*A solution of PVB in methanol without silver nitrate.
**Ciba, Tarrytown, NY.
***Sigma Aldrich, St. Louis, MO.

The data in Table 1 show that, as a result of the addition of silver nitrate to the PVB/methanol solution, the yellowness index (YI) was changed from 6 (in Control Example CE2) to 290.1 (in Control Example CE3). Upon addition of an unsaturated heterocyclic compound (benzotriazole in Examples humidity (RH) for 1000 hours and subjected to a bias of 1000 V. After this exposure, the PVB sheet in the laminate of Control Example CE8 was dark brown, while the PVB sheet in the laminate of Example E6 was only lightly yellowed. This result demonstrates that the addition of the 0.5 wt % of 1H-benzotriazole mitigates the yellowing of a PVB sheet that is in contact with silver.

While certain of the preferred embodiments of the present invention have been described and specifically exemplified above, it is not intended that the invention be limited to such embodiments. Various modifications may be made without departing from the scope and spirit of the present
invention, as set forth in the following claims.

What is claimed is:

1. A solar cell module comprising a solar cell assembly comprising one or more solar cells and a poly(vinyl butyral) encapsulant, wherein (i) the solar cell assembly further comprises a silver component; (ii) the silver component comprises elemental silver; (iii) the silver component is in contact with the poly(vinyl butyral) encapsulant; (iv) the poly(vinyl butyral) encapsulant comprises a poly(vinyl butyral) polymer, about 15 to about 45 wt % of one or more plasticizers and about 0.1 to about 2 wt % of one or more unsaturated heterocyclic compounds, based on the total weight of the poly(vinyl butyral) encapsulant; and
further wherein the unsaturated heterocyclic compound is a 1,2,3-triazole or a 1,2,3-triazole derivative having a formula of:

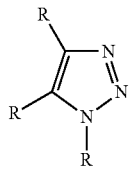

wherein R represents a hydrogen atom or a substituent; wherein, when the unsaturated heterocyclic compound comprises more than one substituent R, the substituents R are identical or different; and wherein the substituents R are selected from the group consisting of alkyl groups that are branched or unbranched, linear or cyclic; singly or multiply unsaturated hydrocarbon groups that are unbranched or branched, linear or cyclic, aromatic or non-aromatic; amino groups; hydroxyl groups; alkoxy groups; and halogen atoms; and further wherein one or more of the substituents R may optionally be substituted with one or more halogen atoms that may be the same or different or with one or more branched or unbranched alkyl groups comprising from 1 to 4 carbon atoms that may be the same or different.

2. The solar cell module of claim 1, wherein R represents hydrogen or a substituent selected from the group consisting of branched and linear alkyl groups having from 1 to 4 carbon atoms.

3. The solar cell module of claim 1, wherein the unsaturated heterocyclic compound is 1H-1,2,3-triazole.

4. The solar cell module of claim 1, wherein the poly(vinyl butyral) encapsulant comprises about 0.2 to about 0.5 wt % of the unsaturated heterocyclic compound(s).

5. The solar cell module of claim 1, wherein the poly(vinyl butyral) encapsulant is in the form of a poly(vinyl butyral) sheet; and wherein the poly(vinyl butyral) sheet has a yellowness index of about 60 or less when measured in accordance with ASTM E313-05 after 1000 hours under a bias of 1,000 V and at 85° C. and 85% relative humidity (RH).

6. The solar cell module of claim 1, wherein the poly(vinyl butyral) encapsulant further comprises one or more additives selected from the group consisting of about 0.01 to about 1 wt % of at least one UV absorber; about 0.01 to about 1 wt % of at least one thermal stabilizer; about 0.01 to about 1 wt % of at least one hindered amine; and about 0.01 to about 1 wt % of at least one chelating agent, based on the total weight of the poly(vinyl butyral).

7. The solar cell module of claim 6, wherein the UV absorber(s) are 2H-substituted benzotriazole derivatives; or wherein the thermal stabilizer(s) comprise octylphenol or butylated hydroxytoluene; or wherein the hindered amine(s) are selected from the group consisting of 2,2,6,6-tetramethylpiperadine, 2,2,6,6-tetramethylpiperadinol, 2-(dimethylamino)pyridine, 4-(dimethylamino)pyridine, N-butyl piperidine, N,N-diethyl cyclohexylamine, and hindered amine light stabilizers; or wherein the chelating agent(s) are selected from the group consisting of ethylenediaminetetraacetic acid, ethylenediamine monoacetic acid, ethylenediamine diacetic acid, ethylenediamine triacetic acid, ethylene diamine, tris(2-aminoethyl)amine and diethylenetriaminepentacetic acid.

8. The solar cell module of claim 1, wherein the silver component consists essentially of silver.

9. The solar cell module of claim 1, wherein the silver component comprises at least about 2 wt % of elemental silver.

10. The solar cell module of claim 1, wherein the silver component comprises a silver alloy, and wherein the alloy comprises at least about 2 wt % of elemental silver.

11. The solar cell module of claim 1, wherein the silver component is selected from the group consisting of conductive pastes, connecting wires, conductive coatings, and reflector films.

12. The solar cell module of claim 1, wherein the solar cells comprise wafer-based solar cells selected from the group consisting of monocrystalline silicon (c-Si) and multi-crystalline silicon (mc-Si) based solar cells.

13. The solar cell module of claim 1, wherein the solar cells comprise thin film solar cells and the thin film solar cells comprise one or more materials selected from the group consisting of amorphous silicon (a-Si), microcrystalline silicon (μc-Si), cadmium telluride (CdTe), copper indium selenide (CIS), copper indium/gallium diselenide (CIGS), light absorbing dyes, and organic semiconductors.

14. A pre-lamination assembly for preparing a solar cell module, said pre-lamination assembly comprising:
a solar cell assembly, said solar cell assembly comprising at least one solar cell and a silver component;
a poly(vinyl butyral) sheet having a thickness of about 0.25 mm to about 1.2 mm and comprising a poly(vinyl butyral) encapsulant, said poly(vinyl butyral) encapsulant comprising a poly(vinyl butyral) resin, about 15 to about 45 wt % of a plasticizer and about 0.1 to about 2 wt % of an unsaturated heterocyclic compound, based on the total weight of the poly(vinyl butyral) encapsulant; and
optionally wherein the poly(vinyl butyral) sheet has a yellowness index of about 60 or less, as measured in accordance with ASTM E313-05 after 1000 hours at 85% relative humidity (RH) and at 85° C. with a bias of 1,000 V;
wherein said poly(vinyl butyral) sheet is in contact with the silver component;
wherein the unsaturated heterocyclic compound is a 1,2,3-triazole or a 1,2,3-triazole derivative having a formula of:

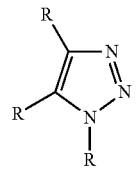

wherein R represents a hydrogen atom or a substituent; wherein, when the unsaturated heterocyclic compound comprises more than one substituent R, the substituents R are identical or different; and wherein the substituents R are selected from the group consisting of alkyl groups that are branched or unbranched, linear or cyclic; singly or multiply unsaturated hydrocarbon groups that are unbranched or branched, linear or cyclic, aromatic or non-aromatic; amino groups; hydroxyl groups; alkoxy groups; and halogen atoms; and further wherein one or more of the substituents R may optionally be substituted with one or more halogen atoms that may be the same or different or with one or more branched or unbranched alkyl groups comprising from 1 to 4 carbon atoms that may be the same or different.

15. The pre-lamination assembly of claim 14, further comprising one or more additional layers selected from the group consisting of:
- a second poly(vinyl butyral) sheet that may be the same as or different from the poly(vinyl butyral) sheet, said second poly(vinyl butyral) sheet being in contact with the solar cell assembly;
- a protective outer layer that is in contact with the poly(vinyl butyral) sheet;
- a second protective outer layer that may be the same as or different from the protective outer layer, said second protective outer layer in contact with the second poly (vinyl butyral) sheet; and
- a substrate or a superstrate that is in contact with the solar cell assembly and with the poly(vinyl butyral) sheet.

16. A process for reducing or preventing discoloration of poly(vinyl butyral) encapsulant in a solar cell module, said process comprising the steps of:
  providing a poly(vinyl butyral) sheet comprising a poly (vinyl butyral) encapsulant, said poly(vinyl butyral) encapsulant comprising a poly(vinyl butyral) resin, about 15 to about 45 wt % of a plasticizer and about 0.1 to about 2 wt % of an unsaturated heterocyclic compound, based on the total weight of the poly(vinyl butyral) encapsulant, and optionally wherein the poly (vinyl butyral) sheet has a yellowness index of about 60 or less in accordance with ASTM E313-05 after 1000 hours at 85% relative humidity (RH) and at 85° C. with a bias of 1,000 V;
  wherein the unsaturated heterocyclic compound is a 1,2,3-triazole or a 1,2,3-triazole derivative having a formula of:

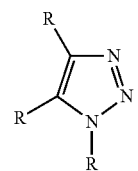

wherein R represents a hydrogen atom or a substituent; wherein, when the unsaturated heterocyclic compound comprises more than one substituent R, the substituents R are identical or different; and wherein the substituents R are selected from the group consisting of alkyl groups that are branched or unbranched, linear or cyclic; singly or multiply unsaturated hydrocarbon groups that are unbranched or branched, linear or cyclic, aromatic or non-aromatic; amino groups; hydroxyl groups; alkoxy groups; and halogen atoms; and further wherein one or more of the substituents R may optionally be substituted with one or more halogen atoms that may be the same or different or with one or more branched or unbranched alkyl groups comprising from 1 to 4 carbon atoms that may be the same or different;

forming a solar cell module by encapsulating a solar cell assembly in the poly(vinyl butyral) sheet, said solar cell assembly comprising a silver component that is in contact with the poly(vinyl butyral) sheet; and operating the solar cell module under a set of conditions for a period of time;

wherein the yellowness index of the poly(vinyl butyral) encapsulant will be unchanged after the period of operation; or wherein the change in the yellowness index of the poly (vinyl butyral) encapsulant after the period of operation is smaller than the change in the yellowness index of a second poly(vinyl butyral) encapsulant after the same period of operation under the same set of conditions in a second solar cell module that is identical to the solar cell module; except that said second poly(vinyl butyral) encapsulant does not comprise an unsaturated heterocyclic compound.

* * * * *